(12) United States Patent
Wang et al.

(10) Patent No.: US 12,164,865 B2
(45) Date of Patent: Dec. 10, 2024

(54) METHOD AND APPARATUS FOR PROCESSING DOCUMENT, DEVICE AND MEDIUM

(71) Applicant: Beijing Zitiao Network Technology Co., Ltd., Beijing (CN)

(72) Inventors: Changming Wang, Beijing (CN); Ziheng Song, Beijing (CN); Zhiwei Yuan, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/540,523

(22) Filed: Dec. 14, 2023

(65) Prior Publication Data

US 2024/0126986 A1 Apr. 18, 2024

Related U.S. Application Data

(63) Continuation of application No. PCT/CN2022/119381, filed on Sep. 16, 2022.

(30) Foreign Application Priority Data

Sep. 18, 2021 (CN) .......................... 202111111900.X

(51) Int. Cl.
*G06F 40/186* (2020.01)
*G06F 21/62* (2013.01)

(52) U.S. Cl.
CPC ........ *G06F 40/186* (2020.01); *G06F 21/6209* (2013.01)

(58) Field of Classification Search
CPC ........................ G06F 40/186; G06F 21/6209
See application file for complete search history.

(56) References Cited

U.S. PATENT DOCUMENTS

2020/0320110 A1* 10/2020 Kawano ................. G06V 20/20
2021/0150124 A1* 5/2021 Peng ..................... G06F 40/258

FOREIGN PATENT DOCUMENTS

| CN | 108984685 A | 12/2018 |
|---|---|---|
| CN | 110807302 A | 2/2020 |

(Continued)

OTHER PUBLICATIONS

International Search Report in PCT/CN2022/119381, mailed Dec. 16, 2022, 5 pages.

*Primary Examiner* — Cao H Nguyen
(74) *Attorney, Agent, or Firm* — Astute IP Law Group

(57) ABSTRACT

Examples of the disclosure relate to a method and apparatus for processing a document, a device, and a medium. The method includes: obtaining document parameter information of a document to be created in response to satisfying a preset online document creation condition; and generating a new target online document based on the document parameter information. The preset online document creation condition includes at least one of the following conditions: a preset document update period is reached, and a target data object is collected through the target online document in the update period; and a size of data in a first online document reaches a preset size of data, or a first online document is determined to fail to completely bear a size of data to be written in a next data collection period or a data collection task.

26 Claims, 9 Drawing Sheets

Obtain document parameter information of a document to be created in response to satisfying a preset online document creation condition — 101

Generate a target online document based on the document parameter information — 102

(56) References Cited

FOREIGN PATENT DOCUMENTS

| CN | 112527746 | A | * | 3/2020 | |
|---|---|---|---|---|---|
| CN | 111144083 | A | * | 5/2020 | |
| CN | 111339557 | A | * | 6/2020 | ........... G06F 21/604 |
| CN | 111767563 | A | | 10/2020 | |

* cited by examiner

METHOD AND APPARATUS FOR PROCESSING DOCUMENT, DEVICE AND MEDIUM

CROSS-REFERENCE TO RELATED APPLICATION(S)

The disclosure is a Continuation application of International Patent Application No. PCT/CN2022/119381, filed on Sep. 16, 2022, which claims priority to Chinese Patent Application No. 202111111900.X filed on Sep. 18, 2021 and entitled "Method and apparatus for processing document, device and medium", the disclosures of which are incorporated in their entireties herein by reference.

FIELD

The disclosure relates to the technical field of computer application, and particularly relates to a method and apparatus for processing a document, a device, and a medium.

BACKGROUND

It is common to collect data in daily production and life. For instance, operation data of stores and chain stores in operation has to be gathered.

In the related art, related data needs to be collected on site, recorded manually and then summarized before it is gathered. For instance, an inspection user can collect store data after a store manager is provided with a paper form at a corresponding store and fills in it. Further, the inspection personnel can summarize data collected from all stores.

However, such a method for collecting data requires that the user must collect data on site and record data manually, which is low in data collection efficiency.

SUMMARY

In order to solve all or at least some of the technical problems described above, the disclosure provides a method and apparatus for processing a document, a device, and a medium.

An example of the disclosure provides a method for processing a document. The method includes: obtaining document parameter information of a document to be created in response to satisfying a preset online document creation condition; and generating a new target online document based on the document parameter information. The preset online document creation condition includes at least one of the following conditions that a preset document update period is reached, and a target data object is collected through the target online document in the update period; or either a size of data in a first online document reaches a preset size of data, or a first online document is determined to fail to completely bearing a size of data to be written in a next data collection period or a data collection task. The first online document is a document configured to collect the target data object before the online document creation condition is satisfied.

According to the method for processing a document of the example of the disclosure, a data object may be collected through an online document, and the online document may be automatically generated based on the data collection period or the data collection task, such that document generation is closely combined with data collection itself, and efficiency of data collection with a document is improved.

An example of the disclosure provides a method for processing a document. The method includes: receiving an editing operation from a user on a document, and determining a document position corresponding to the editing operation; and obtaining preset permission information corresponding to the user, and controlling, in response to the permission information including editing operation restriction permission, the editing operation based on an editing control strategy in the editing operation restriction permission corresponding to the document position.

According to the method for processing a document of the example of the disclosure, the editing operation from the user on the document is received, and the document position corresponding to the editing operation is determined; and further, the preset permission information corresponding to the user is obtained, and in response to the permission information belonging to the editing operation restriction permission, the editing operation is controlled based on the preset editing control strategy corresponding to the document position. In this way, the editing operation of an online document is controlled, which provides technical support to satisfy diverse demands of an online document editing scene.

An example of the disclosure provides a method for processing a document. The method includes: obtaining a target online document for collecting a plurality of items of target data for different users, where different data collection zones of the target online document correspond to different users, and each of the data collection zones includes a plurality of target data collection sub-zones to be edited by a corresponding user; transmitting a document link of the target online document to a plurality of users based on configuration information, where the document link is associated with display permission information, and the display permission information indicates that a data collection zone visible to a first user receiving the document link is different from a data collection zone visible to a second user receiving the document link; and opening the target online document corresponding to the document link in response to an opening operation of a user, receiving editing information triggered by the user in a target data collection sub-zone of a visible data collection zone corresponding to the user, and updating a target data value in the target data collection sub-zone with the editing information, where in a same target data collection period or target data collection task, in response to the user repeatedly opening the target online document, the target data value corresponding to the target data collection sub-zone in the data collection zone is updated with the editing information that is input when the target online document is subsequently opened.

According to the method for processing a document of the example of the disclosure, different data collection zones corresponding to different users are configured in the target online document, such that the editing information of a plurality of target users may be collected based on one target online document. In addition, when the user edits the data collection zone corresponding to the user by clicking on the document link repeatedly, the same data collection zone corresponding to the user in the target online document is synchronously updated based on the editing information of the data collection zone edited repeatedly, and no new data collection zone is added, such that increase in data processing pressure caused by each time of addition of a new data collection zone is avoided, and further data collection efficiency is improved.

An example of the disclosure provides a method for processing a document. The method includes: receiving a document link of a document, where different data collection zones of the document correspond to different users, and the data collection zone includes a plurality of target data collection sub-zones to be edited; displaying a target data collection sub-zone in a target online document corresponding to the user based on permission information pre-configured in association with the document link in response to a triggering operation from the user on the document link, receiving editing information triggered by the user in the target data collection sub-zone in the data collection zone, and updating a target data value in the target data collection sub-zone with the editing information; and updating the target data value corresponding to the target data collection sub-zone of the data collection zone based on the editing information that is input from the user when the target online document is subsequently opened, in response to the user triggering the document link and opening the target online document repeatedly, where the target data value is within a same target data collection period or target data collection task.

An example of the disclosure further provides an apparatus for processing a document. The apparatus includes: a first obtaining module configured to obtain document parameter information of a document to be created in response to satisfying a preset online document creation condition; and a generation module configured to generate a target online document based on the document parameter information, where the preset online document creation condition includes at least one of the following conditions: a preset document update period is reached, and a target data object is collected through the target online document in the update period; either a size of data in a first online document reaches a preset size of data, and alternatively, or a first online document is determined to fail to completely bearing a size of data to be written in a next data collection period or a data collection task, where the first online document is a document configured to collect the target data object before the online document creation condition is satisfied.

An example of the disclosure further provides an apparatus for processing a document. The apparatus includes: a determination module configured to receive an editing operation from a user on a document, and determine a document position corresponding to the editing operation; and a control module configured to obtain preset permission information corresponding to the user, and control, in response to the permission information including editing operation restriction permission, the editing operation based on an editing control strategy in the editing operation restriction permission corresponding to the document position.

An example of the disclosure further provides an apparatus for processing a document. The apparatus includes: a second obtaining module configured to obtain a target online document for collecting a plurality of items of target data for different users, where different data collection zones of the target online document correspond to different users, and each of the data collection zones includes a plurality of target data collection sub-zones to be edited by a corresponding user; a transmission module configured to transmit a document link of the target online document to a plurality of users based on configuration information, where the document link is associated with display permission information, and the display permission information indicates that a data collection zone visible to a first user receiving the document link is different from a data collection zone visible to a second user receiving the document link; and a first updating module configured to open the target online document corresponding to the document link in response to an opening operation of a user, receive editing information triggered by the user in a target data collection sub-zone of a visible data collection zone corresponding to the user, and update a target data value in the target data collection sub-zone with the editing information, where in a same target data collection period or target data collection task, in response to the user repeatedly opening the target online document repeatedly, the target data value corresponding to the target data collection sub-zone in the data collection zone is updated with the editing information that is input when the target online document is subsequently opened.

An example of the disclosure further provides an apparatus for processing a document. The apparatus includes: a receiving module configured to receive a document link of a document, where different data collection zones of the document correspond to different users, and the data collection zone includes a plurality of target data collection sub-zones to be edited; a display module configured to display a target data collection zone corresponding to a user in the document based on permission information pre-configured in association with the document link in response to a triggering operation from the user on the document link; and a second updating module configured to update a target data value corresponding to the target data collection sub-zone in the data collection zone based on editing information that is input from the user when a target online document is subsequently opened, in response to determining that the user repeatedly opening the target online document, where the operation of repeatedly opening is within a same target data collection period or target data collection task.

An example of the disclosure further provides an electronic device. The electronic device includes: a processor; and a memory configured to store an executable instruction executable by the processor. The processor is configured to read the executable instruction from the memory and execute the instruction, so as to implement the method for processing a document according to the examples of the disclosure.

An example of the disclosure further provides a computer-readable storage medium, which stores a computer program. The computer program is configured to execute the method for processing a document according to the examples of the disclosure.

BRIEF DESCRIPTION OF THE DRAWINGS

What is described above and other features, advantages and aspects of examples of the disclosure will become more obvious with reference to the following specific embodiments in conjunction with the accompanying drawings. In the drawings, the same or similar reference numerals denote the same or similar elements. It should be understood that the drawings are illustrative, and components and elements are not necessarily drawn to scale.

DETAILED DESCRIPTION OF EMBODIMENTS

Figure 1:
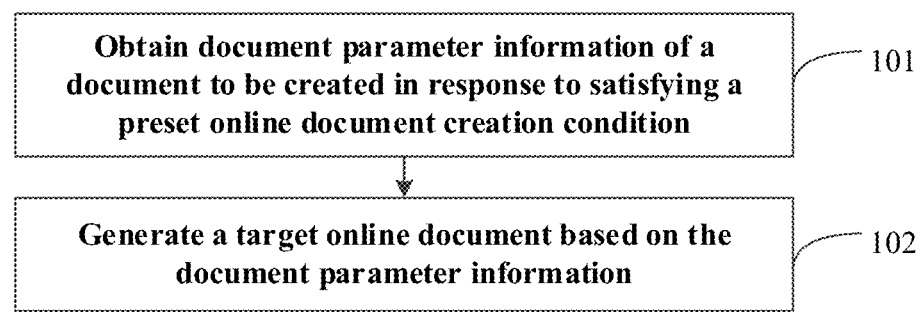
FIG. 1 is a schematic flow diagram of a method for processing a document according to an example of the disclosure.

Examples of the disclosure will be described in more detail below with reference to the accompanying drawings. Although some examples of the disclosure are shown in the accompanying drawings, it should be understood that the disclosure may be implemented in various forms and is not intended to be limited to the examples illustrated herein. Rather, the examples are provided for a more thorough and complete understanding of the disclosure. It should be understood that the drawings and the examples of the disclosure are only for illustrative purposes, instead of limiting the protection scope of the disclosure.

It should be understood that all steps described in method embodiments of the disclosure may be executed in a different order and/or in parallel. Further, the method embodiments may include additional steps and/or omit execution of the illustrated steps, which do not limit the scope of the disclosure.

The terms "include" and "comprise" used herein and their variants mean open inclusion, that is, "including but not limited to" and "comprising but not limited to". The term "based on" means "at least partly based on". The term "an example" means "at least one example". The term "another example" means "at least another example". The term "some examples" means "at least some examples". Related definitions of other terms will be given in the following description.

It should be noted that concepts such as "first" and "second" mentioned in the disclosure are only used to distinguish different apparatuses, modules or units, and are not used to limit an order or interdependence of functions executed by the apparatuses, modules or units.

It should be noted that modification of "a", "an" or "a plurality of" mentioned in the disclosure is illustrative rather than limitative, and should be understood by those skilled in the art as "one or more" unless explicitly stated otherwise in the context.

Names of messages or information exchanged between a plurality of apparatuses in the embodiment of the disclosure are only for illustrative purposes, instead of limiting the scope of the messages or information.

In order to solve the problems described above, an example of the disclosure provides a data collection form of an online document. Because a document is online, operations from data collection to summarization may be conducted online, such that data collection efficiency is greatly improved.

On the basis that the document undergoing data collection is online, practical problems encountered in data collection with the online document in different scenes are further found and analyzed, and corresponding solutions are provided for the practical problems, which will be illustratively and separately introduced below.

A data collection process of the online document in the example of the disclosure will be described below.

Firstly, in view of the practical problems encountered in data collection with the online document, the problems are solved by improving a method for creating the online document, which will be illustratively described below.

FIG. 1 is a flow diagram of a method for processing a document according to an example of the disclosure. The method may be executed by an apparatus for processing a document. The apparatus may be implemented by software and/or hardware, and may be generally integrated into a server. As shown in FIG. 1, the method includes the following steps:

Step 101, document parameter information of a document to be created is obtained in response to satisfying a preset online document creation condition.

In the example, the preset online document creation condition includes at least one of the following:

In a first instance, a target data object is collected through a target online document in a preset document update period. The target data object may be a data object to be collected in a scene, which may be sales, attendance, etc. for instance.

That is, an online document is created periodically and automatically in the instance. The document update period may be calibrated according to experimental data or determined according to data collection demands. The online document is created periodically and automatically, such that memory overflow caused by the great size of data of the online document can be avoided, and further data collected in the same period are stored in the same online document while data collected in different periods are stored in different online documents when data collection is required periodically. In this way, the data collected in different periods may be automatically classified by automatically creating the online document and replacing an original document with the newly created document, and further data processing efficiency in the later period is improved.

In a second instance, in order to avoid the problems that storage efficiency is influenced and even local memory overflow is caused due to the great size of data collected by the online document in the instance, whether the size of data collected by the online document is greater than a certain value may be determined, or the size of data collected may be greater than a certain value if collection of related data is continued.

If the size of data is greater than a certain value, it is determined that the preset online document creation condition is satisfied, the online document is re-created for data collection, and the data collected by the original online document is archived and stored.

In the example, the size of data of a first online document created and configured to collect the target data object before the online document creation condition is satisfied is obtained. If the size of data of the first online document reaches the preset size of data, it is considered that the preset online document creation condition is satisfied, such that local overflow is avoided, and further a new online document is created.

The created online document may collect data periodically and is configured to collect the target data object in each period, such that an online document may bear data collected in a plurality of periods. In order to avoid memory overflow in the example, in response to determining that the first online document fails to completely bear a size of data to be written in a next data collection period or a data collection task, that is, the first online document fails to completely bear the size of all data to be written in the next data collection period, or cannot store the size of all data to be written in a current data collection period, it is considered that the preset online document creation condition is satisfied, such that a new online document is created and generated.

Generally, the online document is created in response to a creation operation from a user. In a data collection scene of the disclosure, it is found that some types of online documents generally have a data bearing capacity limitation due to a technical limitation of the online document itself. For instance, an online form has a limitation on the maximum number of data rows. In another case, the data collection task itself has some characteristics. For instance, some data collection tasks are conducted periodically. Therefore, when data is collected with the online document, a creation method and a creation opportunity of the online document are combined with the characteristics of the data collection task itself, and the target online document is automatically created when the preset document update period is reached, or the size of data in the first online document reaches the preset size of data, or it is determined that the first online document fails to completely bear the size of data to be written in the next data collection period or the data collection task. The target data object is collected through the target online document in the update period, and the first online document is a document configured to collect the target data object before the online document creation condition is satisfied. The method for automatically creating a document described above can avoid memory overflow caused by the great size of data of the online document during data collection, and can further store the data collected in the same period in the same online document while storing the data collected in different periods in different online documents when data collection is required periodically. In this way, the data collected in different periods may be automatically classified by automatically creating the online document and replacing the original document with the newly created document, and further data processing efficiency in the later period is improved.

It should be noted that the online document in the example can achieve online editing and data updating. A form of the online document is not limited by the disclosure, which may be an online form for instance. If the online document is the online form, it may be considered that the online document creation condition is satisfied when the number of data collection zones of a first online form configured to currently collect the target data object reaches a preset threshold, or it is determined that a data collection zone of a first online form fails to completely bear the size of data to be written in the next data collection period or the data collection task.

Further, after the preset online document creation condition is satisfied, the document parameter information of the document to be created is obtained. The document parameter information includes layout information of the online document, the number of rows in the data collection zone, document index information guiding filling of the target data object, etc. In this way, the corresponding document parameter information is determined based on the data collection task, such that the created document can satisfy demands of the data collection task. In an example of the disclosure, associated configuration information is determined according to the data collection task of the target data object. For instance, a configuration information input interface is displayed to a related configurator, and the associated configuration information input from the related configurator into the input interface is obtained. Further, the document parameter information of the document to be created is obtained according to the configuration information. A corresponding relation between the configuration information and the document parameter information may be pre-stored, and the corresponding document parameter information may be obtained based on querying of the corresponding relation.

Step 102, the target online document is generated based on the document parameter information.

In the example, a display effect of the online document presented to a filling user may be determined based on the document parameter information. Further, how to collect data with the online document may be determined, which includes what information to collect, where to fill with different information, whether there are limitations, etc. The document parameter information configured to generate the target online document is determined based on the data collection task, such that the generated target online document may be adapted to the data collection task, and data collection efficiency and data availability are improved. In this way, the target online document is generated according to the document parameter information.

In an actual implementation process, data filling accuracy and efficiency of the user can be improved through related setting of the document parameter information configured to generate the online document.

In some examples of the disclosure, first configuration information is preset. The first configuration information includes user-associated information. The user-associated information includes information associated with a current data collection task. In the example, the first preset configuration information is queried, such that the user-associated information configured for system setting in an online document to be created is obtained. The first configuration information may be obtained by an authorized information management department after legal authorization.

In this way, when the online document is generated, the user-associated information is automatically filled with, and the user-associated information is prohibited from being edited by the user, such that filling efficiency of the online document is improved, reliability of data collection of the online document is ensured to a certain extent, and the user is prevented from illegally tampering with the user-associated information.

Figure 2:
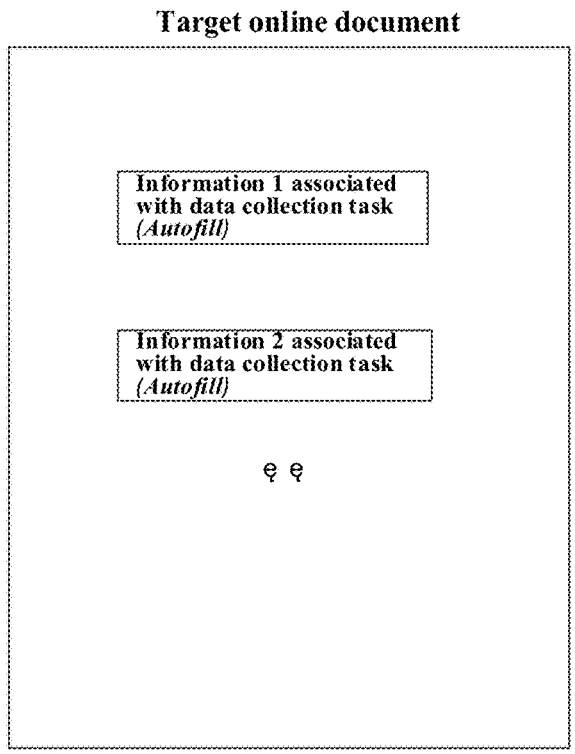
FIG. 2 is a schematic diagram of a scene for processing a document according to an example of the disclosure.

In the example, when the user-associated information includes information 1 and 2 associated with the current data collection task as shown in FIG. 2 and the corresponding online document is generated, a corresponding field is directly filled with the corresponding user-associated information, and the user-associated information is prohibited from being edited by the user. When the user clicks on the corresponding user-associated information, a reminder message of "prohibit editing" may further be displayed.

In another example of the disclosure, second configuration information is preset. The second configuration information includes document index information, the document index information may be in any one of a text form, an image form, an animation form, etc., and the document index information is configured to remind the user about editing of a target data value corresponding to the index information at a corresponding position. In this way, when the online document is created, the second preset configuration information is queried, such that the document index information in the online document to be created is obtained from the second configuration information, and further the user is guided to edit the target data value corresponding to the index information according to the document index information.

Figure 3:
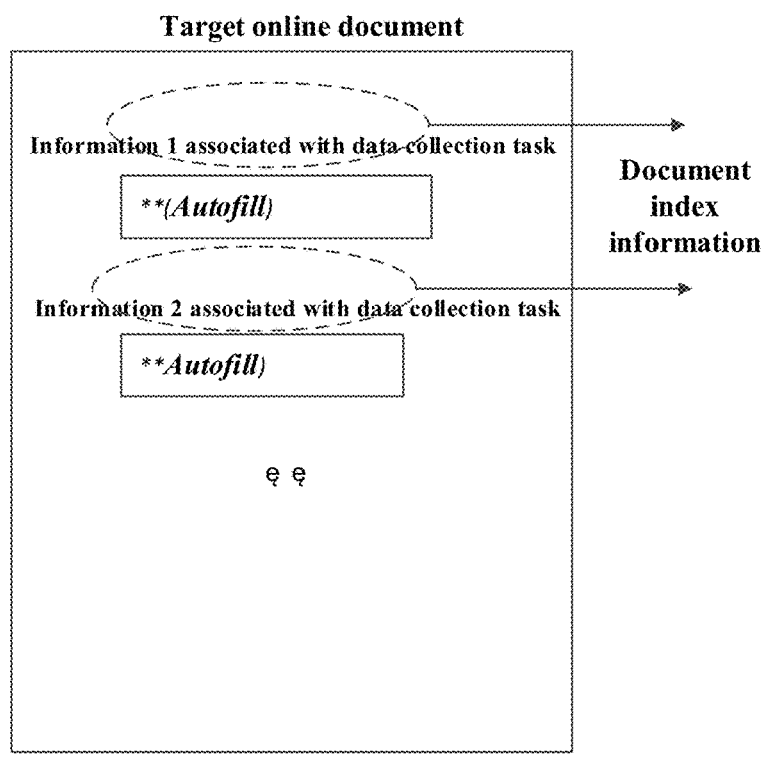
FIG. 3 is a schematic diagram of another scene for processing a document according to an example of the disclosure.

In the example, as shown in FIG. 3, when the fields to be filled in the online document include the information 1 and information 2 associated with the current data collection task and the corresponding online document is generated, the document index information such as "information 1 associated with the current data collection task" and "information 2 associated with the current data collection task" are directly displayed in an associated zone of the corresponding fields. The user fills with corresponding data according to the document index information, such that filling efficiency and accuracy of the online document of the user are improved.

In some examples, identifier information such as a document name of the automatically generated target online document may carry information of the data collection period or data collection task corresponding to the target online document, for instance, a data collection date and other period information, a name of the collection task, a location where data collection occurs, etc. For instance, in a scene of collecting store information, a document identifier of the automatically generated target online document may carry the data collection date, a store name, etc. When a plurality of data collection points exist in a certain zone, and data to be collected by each of the data collection points is filled in a preset data collection zone of the automatically generated document, the document identifier of the automatically generated target online document may carry name information of the zone, for instance, the Dongcheng District or Xicheng District.

The identifier information of the automatically generated target online document carries the information corresponding to the data collection period and/or collection task, such that archiving and searching of the target online document can be facilitated, and further data can be analyzed and used later advantageously.

In some examples, when the online document is archived, the target online document to be archived may be stored in a preset cloud storage space, such that subsequent reading of the online document is facilitated in the cloud storage space.

In the example, a storage address of the target data object in the cloud storage space may be preset. The storage address may be specified by the user or automatically assigned by a server. The target online document is archived to the storage address of the target data object in the cloud storage space.

For instance, an association relationship between the target data object and an archiving address may be set. When the target online document is archived, the archiving address of the target online document may be determined based on the target data object collected by the target online document and the association relationship, and further archiving is conducted.

For instance, when the target online document is automatically generated, the archiving address of the target online document may be set based on the association relationship, and the target online document may be archived to the archiving address when an archiving opportunity is satisfied. In some possible examples, before collection of the target data object is completed with the target online document, the storage address of the target data object in the cloud storage space is set. In this way, when the target online document is archived to the storage address of the target data object in the cloud storage space, after collection of the target data object is completed with the target online document, the target online document is archived to the storage address of the target data object in the cloud storage space in response to determining at least one of the following: the target online document reaches the preset document update period; or a size of data in the target online document reaches a preset size of data; or the target online document completes a size of data to be written in a data collection period or a data collection task.

In the example of the disclosure, when the online document is archived, the target online document to be archived may further be archived to the preset cloud storage space, such that full use of the cloud storage space is facilitated, and further a related online document may be obtained based on the document link.

In the example, the storage address of the target data object in the cloud space is preset. For instance, the storage address may be a cloud storage address such as a directory designated by a knowledge base. Further, the target online document configured to collect the target data object is archived to the storage address. In this way, regardless of whether the online document configured to collect the target data object itself is updated or not, and whether the number of online documents configured to bear the target data object is one or more, the target data value collected for the target data object may be stored in the pre-specified cloud storage space, such that a plurality of documents corresponding to the target data object may be uniformly and automatically archived, and efficiency of subsequent data management and search can be improved.

In some examples of the disclosure, the online document may be transmitted to the user in the form of the document link. That is, in the example, the document link of the target online document is transmitted to at least one user according to third preset configuration information. The preset configuration information may include identifier information of a user to fill with data, transmission time of the document link, etc.

In the example, the document link of the target online document is transmitted to the at least one user according to the preset configuration information. Further, editing information for the target online document after the user triggers the document link may be obtained in real time. The editing information includes data input into a related field. In the example, the editing information is stored in the target online document in response to receiving the editing information. In this way, synchronous storage of the editing information filled with may be achieved without a submitting operation from the user.

In conclusion, according to the method for processing a document of the example of the disclosure, the document parameter information of the document to be created is obtained in response to satisfying the preset online document creation condition, and the target online document is generated according to the document parameter information. In this way, online document creation is adapted to the data collection task, and data is collected through the online document, such that data collection efficiency is improved.

It may be necessary to collect the target data objects of the plurality of users in a data collection scene. For instance, a target data object of a store manager of each store needs to be collected during store inspection. If a separate online document is generated for each store manager, generation efficiency of the online document may be low. In this way, data collection efficiency is further influenced, and later management and maintenance of data are inconvenient.

Therefore, some examples of the disclosure further provide a method for collecting target data objects of a plurality of online users based on an online document.

In the example, the target online document includes a plurality of data collection zones, and each of the data collection zones includes two or more target data collection sub-zones to be edited. Each of the data collection zones corresponds to one user, and different users correspond to different data collection zones. In this way, different users are distinguished in an online document through the data collection zones, and data is collected on the plurality of users based on one document, such that data collection efficiency is improved. In addition, the target data collection sub-zone corresponding to each of the data collection zones is configured to collect data of a related target data object.

Figure 4:
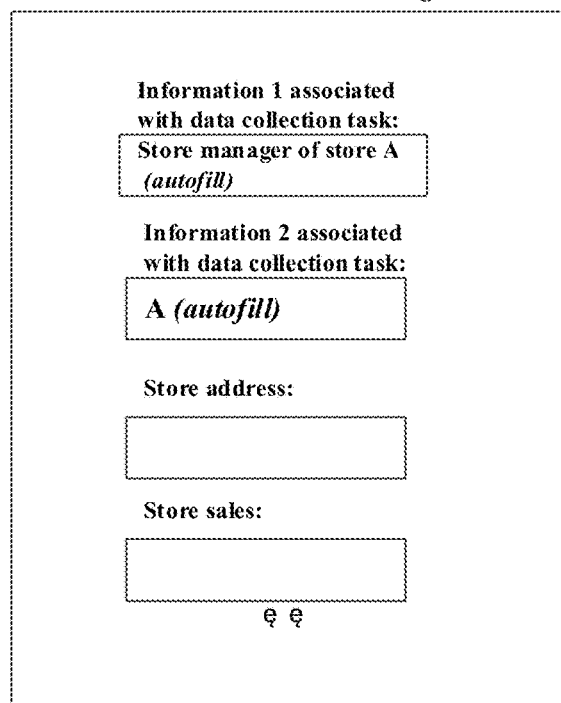
FIG. 4 is a schematic diagram of yet another scene for processing a document according to an example of the disclosure.

In the example, when the online document is the online form, the data collection zone may include one or more data rows. Each of the data rows has a plurality of cells, each of the cells corresponds to a different column, and different columns are configured to collect different types of information. Each of the cells may be equivalent to a target data collection sub-zone in the example of the disclosure. For instance, in a scene of store sales statistical processing, a data collection zone corresponding to store manager A may be as shown in FIG. 4, and the data collection zone includes target data collection sub-zones such as "information 1 associated with a data collection task", "information 2 associated with a data collection task", "store address" and "store sales".

Figure 5:
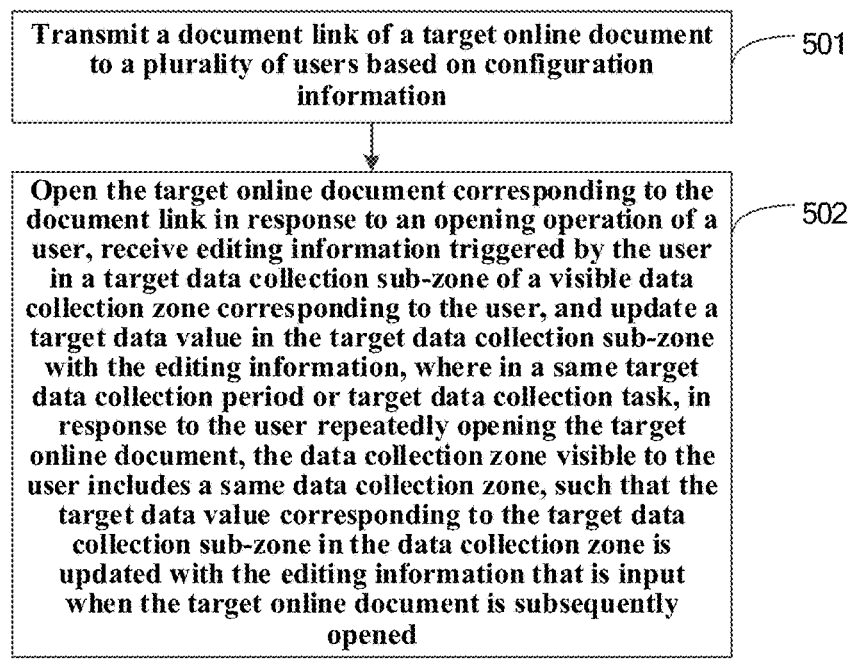
FIG. 5 is a schematic flow diagram of another method for processing a document according to an example of the disclosure.

In the example, as shown in FIG. 5, the method for processing a document further includes the following steps:

Step 501, a document link of a target online document is transmitted to a plurality of users according to configuration information.

The document link is associated with display permission information, and the display permission information is configured to indicate that a data collection zone visible to a first user receiving the document link is different from a data collection zone visible to a second user receiving the document link.

In the example, the document link of the target online document is transmitted to the plurality of users according to the configuration information. The configuration information may include user identifiers of the plurality of users to whom the target online document is transmitted and transmission time. In the example, the document link is configured in association with display permission of the data collection zones corresponding to different users in the target online document. In this way, each user may only see the corresponding data collection zone, such that data leakage of other users is avoided.

It should be noted that methods for configuring the document link in association with the display permission of the data collection zones corresponding to different users in the target online document may be different in different application scenes, which are illustrated as follows:

In some possible examples, in response to detecting a clicking operation of the user for the document link, user identifier information of the user is obtained, and corresponding configuration information is queried according to the user identifier information. For instance, the configuration information may be stored in a data form, and the configuration information includes a corresponding relation between the user identifiers and the data collection zones. In this way, data collection zone information corresponding to the user is displayed to the user based on the configuration information.

In some other possible examples, a server pre-marks and stores the user identifier information having editing permission corresponding to each data collection zone in the target online document, obtains the user identifier information of the user executing a triggering operation in response to detecting the triggering operation from the user on the document link, and enables the user identifier information to match the user identifier information having the editing permission. In this way, when the target online document is displayed to the user, the data collection zone where the user identifier information successfully matches the user identifier information having the editing permission is displayed, and all the data collection zones where matching is unsuccessful are hidden.

Step 502, the target online document corresponding to the document link is opened in response to an opening operation of the user, editing information triggered by the user in a target data collection sub-zone of the visible data collection zone corresponding to the user is received, and a target data value in the target data collection sub-zone is updated according to the editing information, where in the same target data collection period or target data collection task, in response to the user repeatedly opening the target online document, the data collection zones visible to the user include the same data collection zone, such that the target data value corresponding to the target data collection sub-zone of the data collection zone is updated with the editing information that is input when the target online document is subsequently opened.

In the example, the target online document corresponding to the document link is opened in response to the opening operation from the user, further the editing information triggered by the user in the target data collection sub-zone of the visible data collection zone corresponding to the user is received, and the target data value in the target data collection sub-zone is updated according to the editing information.

In the same target data collection period or target data collection task, in response to the user repeatedly opening the target online document, the data collection zones visible to the user may be the same data collection zone, such that the target data value corresponding to the target data collection sub-zone of the data collection zone is updated according to the editing information input when the target online document is subsequently opened. It may also be understood that in the example, after the editing information of repeatedly editing the data collection zone corresponding to the user by repeatedly clicking on the document link by the user is obtained, the same data collection zone corresponding to the user in the target online document is updated synchronously with the editing information of repeated clicking. That is, the same user may edit the target data collection sub-zone of the data collection zone repeatedly, it is the same data collection area that is edited repeatedly, and no new data collection zone is added to collect the editing information input from the user. The server may store the editing information input from the user each time in the data collection zone, instead of generating a new data collection zone each time. The server transmits the document link of the target online document to the corresponding user each time, and the user inputs the current editing information based on the received target online document. Although the user clicks on the document link repeatedly, data is input based on the same target online document. The target online document is only regarded as a carrier for editing information collection, and no new data collection zone needs to be regenerated each time, such that data collection efficiency is greatly improved.

In an actual editing process, in some examples of the disclosure, an editing operation input from the user to the target data collection sub-zone of the data collection zone corresponding to the user through the document link is further obtained, and the editing operation is controlled according to a preset editing control strategy corresponding to the target data collection sub-zone. The editing control strategy enables the user to control a type of the editing operation and an editing content of the user. For instance, if the editing control strategy is to prohibit pre-filled user-associated information from being edited, the editing operation may be considered illegal and rejected when the user edits the pre-filled user-associated information in the corresponding data collection zone. For another instance, if the editing control strategy is to limit the number of words and the number of input words exceeds a word limit when the user inputs words into the target data collection sub-zone of the corresponding data collection zone, the editing operation may be considered illegal and rejected. Particularly, editing restriction duration is set, such that collection time of the target data object may be controlled, and further collected target data may be marked with a preset mark according to a relation between the collection time of the target data object and the editing restriction duration. For instance, whether the collection time is within or outside editing allowed duration, or a length of a distance from editing allowed duration to the collection time. In this way, subsequently data processing is facilitated, and a data collection operation is more standardized.

In some examples, the control strategy for controlling editing of the target data collection sub-zone may be automatically generated according to index information of the target data collection sub-zone. The index information is determined according to document parameters based on which the target online document is generated, and is configured to guide the user to fill in the target data collection sub-zone with information. For instance, the editing restriction duration may be automatically configured according to the index information. For instance, if the index information shows September 6th, the editing restriction duration of the corresponding data collection zone may be automatically configured to indicate that editing is allowed within September 6th and is prohibited after and before September 6th, or marking may be conducted during editing after or before September 6th. Further, a reminder message may be transmitted to the corresponding user when the editing control strategy is about to influence the editing operation of the user, for instance, in preset duration before the editing restriction duration is reached or expires, and the user triggers the reminder message and may jump to the corresponding target data editing sub-zone. In this way, the target online document may be generated and linked with the editing control strategy of the document, such that overall efficiency is improved.

In conclusion, according to the method for processing a document of the example of the disclosure, different data collection zones corresponding to different users are configured in the target online document, such that the editing information of a plurality of target users may be collected based on a target online document. In addition, when the user edits the data collection zone corresponding to the user by clicking on the document link repeatedly, the same data collection zone corresponding to the user in the target online document is synchronously updated with the editing information of the data collection zone edited repeatedly, and no new data collection zone is added, such that increase in internal storage pressure caused by each time of addition of a new data collection zone is avoided, and further data collection efficiency is improved.

Figure 6:
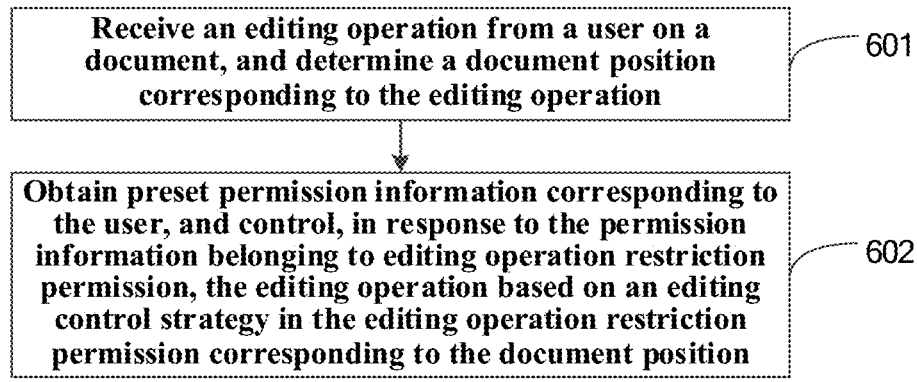
FIG. 6 is a schematic flow diagram of yet another method for processing a document according to an example of the disclosure.

In some other examples, a time limit may be set for input of some data in data collection. For instance, the data collection zone is allowed to be edited only within a certain allowed period of time. When data is collected with the online document, how to solve the problems described above is illustratively described. FIG. 6 is a flow diagram of a method for processing a document according to another example of the disclosure. As shown in FIG. 6, the method includes the following:

Step 601, an editing operation of a user for a document is received, and a document position corresponding to the editing operation is determined.

In the example, the preset document position may be a position where the user may execute the editing operation, for instance, a data filling field.

Step 602, preset permission information corresponding to the user is obtained, and in response to determining that the permission information belongs to editing operation restriction permission, the editing operation is controlled according to an editing control strategy in the editing operation restriction permission corresponding to the document position.

It may be understood that a corresponding relation between the user and permission information is pre-build. In this way, the preset permission information corresponding to the user may be obtained based on the corresponding relationship in the example, and whether the permission information belongs to the editing operation restriction permission may be determined. The editing operation restriction permission is configured to indicate whether the corresponding permission information is associated with other information such as time. For instance, if a piece of permission information indicates open in a certain period of time and not open in a certain period of time, the permission information belongs to the editing operation restriction permission.

In the example, the editing operation is controlled according to the preset editing control strategy corresponding to the document position for the permission information belonging to the editing operation restriction permission. The editing control strategy is configured to indicate a specific manner for controlling permission based on other information such as the time associated with the permission information.

In an example of the disclosure, if the permission information is associated with time information, the editing operation is controlled according to the preset editing control strategy corresponding to the document position as follows:

A data editing zone is displayed according to a first display state within editing restriction duration, and the data editing zone is displayed according to a second display state outside the editing restriction duration, where the second display state is configured to remind the user that editing is not currently allowed in the zone, such that the user is intuitively reminded about an editing prohibition in a current data editing zone. The first display state and the second display state may be distinguished according to colors, text, etc., which is not limited herein.

In the example, editing time corresponding to the editing operation and the preset editing restriction duration corresponding to the document position are obtained. Further, in response to detecting that the editing time does not belong to the editing restriction duration, a preset identifier is set for editing information generated by the editing operation. The preset identifier may be identifier information indicating that editing is conducted in non-editing restriction duration, and may be text, images, codes, etc., which are not listed herein. In addition, the preset identifier may be generated in a server or locally in a user terminal where the user is located.

In addition, in some possible instances, a distinguishing operation may be conducted based on the preset identifier, such that a specific case that the editing time does not belong to the editing restriction duration is indicated. For instance, if starting time of the editing time belongs to the editing restriction duration and ending time of the editing time exceeds ending time of the editing restriction duration, a first preset identifier is generated for the corresponding editing information. For instance, if starting time of the editing time does not belong to the editing restriction duration and ending time of the editing time does not belong to the editing restriction duration, a second preset identifier is generated for the corresponding editing information. For another instance, if starting time of the editing time belongs to the editing restriction duration and ending time of the editing time also belongs to the editing restriction duration, a third preset identifier is generated for the corresponding editing information, such that subsequent classified management of the editing information is facilitated. Manners for generating the first preset identifier, the second preset identifier and the third preset identifier may be preset, such that different cases of the editing duration of the editing information are distinguished.

Therefore, in the example, a collection demand of the same user for a target data collection sub-zone in a plurality of periods of time is satisfied, a plurality of pieces of editing restriction duration may be set based on an editing position of the related target data collection sub-zone, and confusion between the target data collection sub-zones filled repeatedly may be avoided through restriction of the editing restriction duration.

Figure 7:
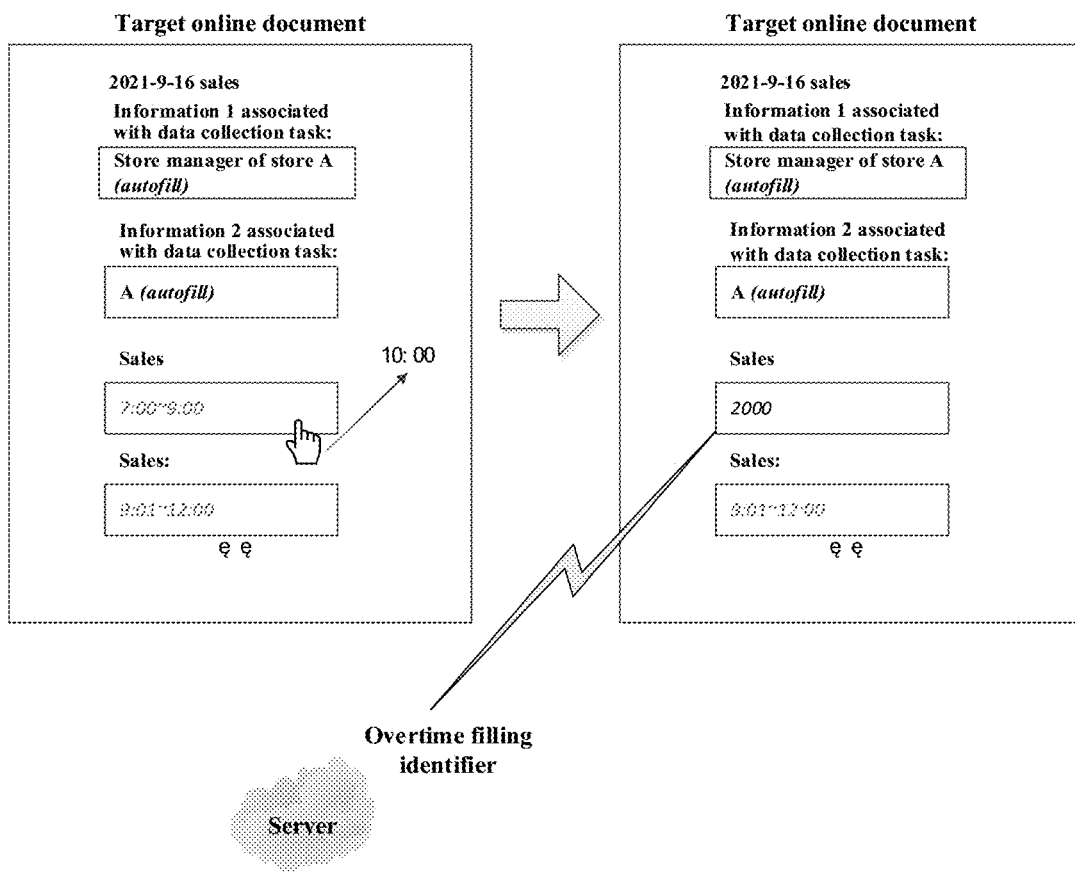
FIG. 7 is a schematic diagram of yet another scene for processing a document according to an example of the disclosure.

For instance, in a sales reporting scene shown in FIG. 7, document positions filled with sales in a plurality of periods of time may be set in the target online document, and each of the document positions is correspondingly configured with the editing restriction duration. In this way, the user is allowed to edit the sales in the corresponding document position only in the corresponding editing restriction duration, and the preset identifier is set for the edited sales generated by the editing operation in response to detecting that the editing time does not belong to the editing restriction duration.

For instance, if the user inputs the sales at 10 o'clock in the document position having the editing restriction duration of sales filling of 7 o'clock to 9 o'clock, a text mark of "overtime filling" is set for the input sales after the sales input from the user to the document position are received, such that subsequent statistical processing of the sales is facilitated.

In some examples of the disclosure, if the permission information is associated with the time information, the editing operation is controlled according to the preset editing control strategy corresponding to the document position as follows: the editing time corresponding to the editing operation and the preset editing restriction duration corresponding to the document position are obtained. The editing restriction duration may be set according to scene demands.

Further, indication information prohibiting overtime editing is transmitted in response to determining that the editing time exceeds the editing restriction duration, such that the editing time may be controlled in some scenes. Alternatively, indication information prohibiting in-advance editing is transmitted in response to determining that the editing time is in advance of the editing restriction duration.

For instance, in an indoor temperature reporting scene, document positions of temperatures corresponding to a plurality of periods of time may be set in the target online document, and different editing restriction duration may be set for each of the document positions filled with the temperature. In this way, the user is allowed to input the temperature to the corresponding document position only in the corresponding editing restriction duration, and cannot input the temperature at other time points. That is, corresponding temperature data cannot be input to the corresponding position earlier or later, such that data falsification is avoided.

Figure 8:
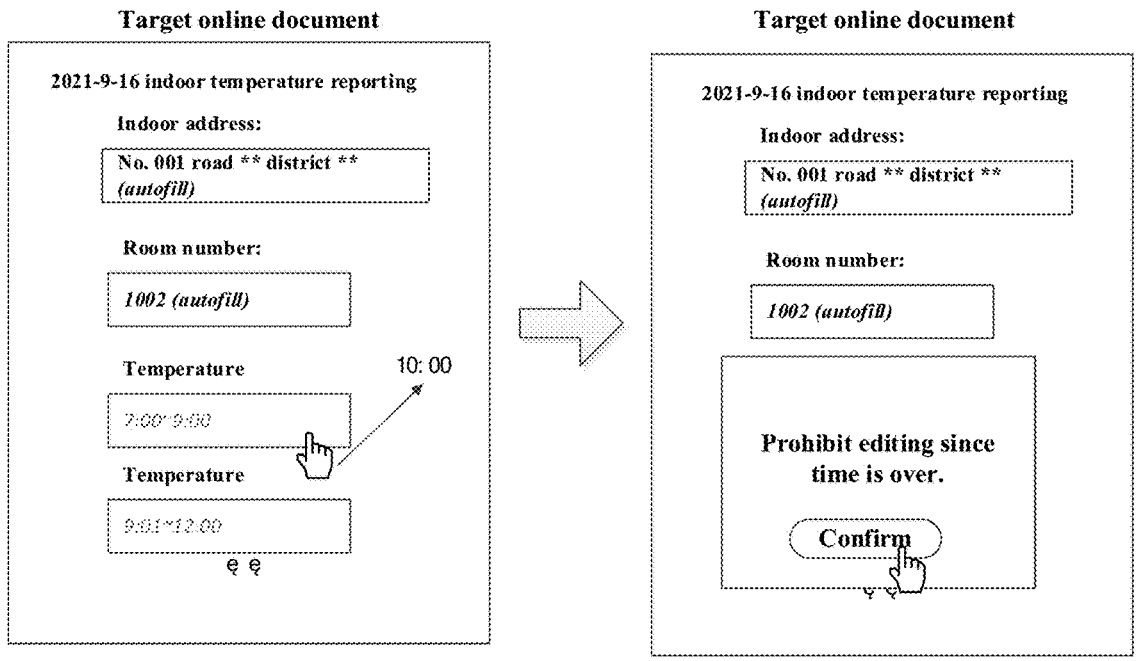
FIG. 8 is a schematic diagram of yet another scene for processing a document according to an example of the disclosure.

For instance, as shown in FIG. 8, if the user executes the editing operation at 10 o'clock in the document position having the editing restriction duration of temperature filling of 7 o'clock to 9 o'clock, the editing operation of the user is rejected, and pop-up indication information of "prohibit editing since time is over" is transmitted.

In some examples of the disclosure, if the permission information is associated with the editing position, the editing operation is controlled according to the preset editing control strategy corresponding to the document position as follows:

The document position corresponding to the editing operation is determined, and indication information prohibiting editing is transmitted in response to determining the document position to be a preset position. The preset position may be the document position of the pre-input user-associated information, and the user is prevented from tampering with the associated information, such that reliability of the associated information corresponding to the target data collection sub-zone is ensured.

In practical application, an online document may include a plurality of data collection zones as mentioned above. Different data collection zones of the document correspond to different users, and each of the data collection zones includes more than two target data collection sub-zones to be edited. In this way, the editing operation is controlled according to the preset editing control strategy corresponding to the document position as follows:

The editing operation of the user for the target data collection sub-zone of the data collection zone corresponding to the user is obtained, and further, the editing operation is controlled according to the preset editing control strategy corresponding to the target data collection sub-zone. For instance, if the editing control strategy is to prohibit pre-filled user-associated information from being edited, the editing operation may be considered illegal and rejected when the user edits the pre-filled user-associated information in the corresponding data collection zone. For another instance, if the editing control strategy is to limit the number of words and the number of input words exceeds a word limit when the user inputs words into the target data collection sub-zone of the corresponding data collection zone, the editing operation may be considered illegal and rejected.

In conclusion, according to the method for processing a document of the example of the disclosure, the editing operation of the user for the document is received, and the document position corresponding to the editing operation is determined; and further, the preset permission information corresponding to the user is obtained, and in response to determining that the permission information belongs to the editing operation restriction permission, the editing operation is controlled according to the preset editing control strategy corresponding to the document position. In this way, the editing operation of an online document is controlled, which provides technical support to satisfy diverse demands of different data collection scenes through the online document.

In some other possible examples, a plurality of data collection sub-tasks may be required in a data collection period or task. How to achieve the case through the online document is a problem to be solved. With an online form as an instance, the following examples illustrate how to manage a plurality of users and a plurality of collection sub-tasks based on the online form.

Figure 9:
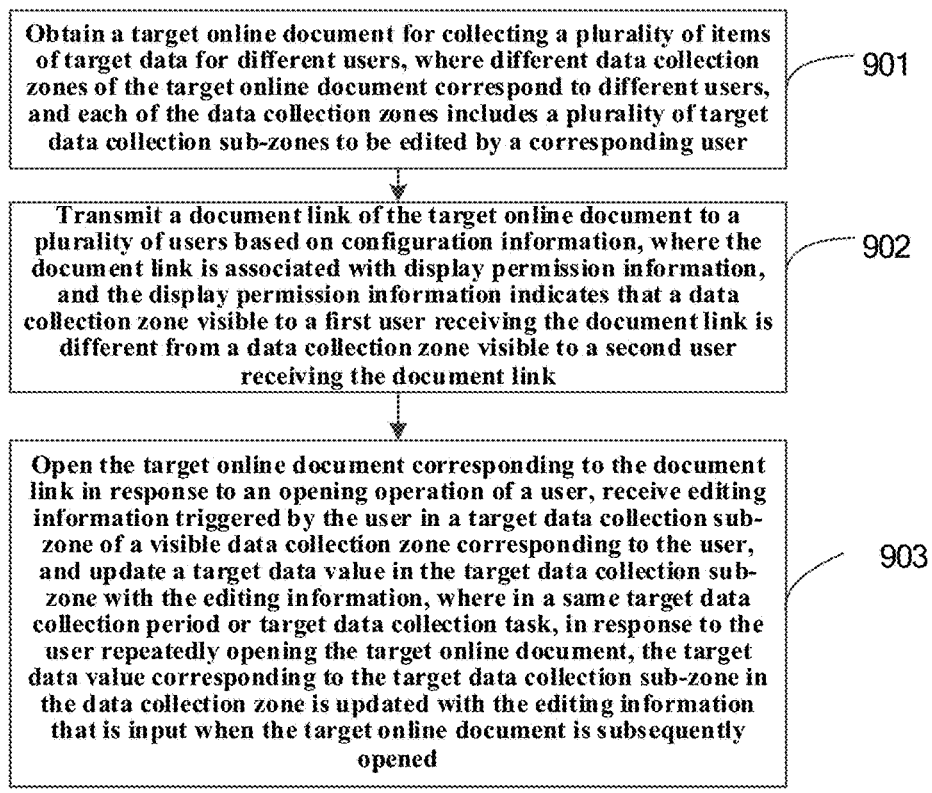
FIG. 9 is a schematic flow diagram of yet another method for processing a document according to an example of the disclosure.

FIG. 9 is a flow diagram of a method for processing a document according to another example of the disclosure. The method is applied to a server. As shown in FIG. 9, the method includes the following:

Step 901, a target online document configured to collect a plurality of items of target data for different users is obtained, where different data collection zones of the target online document correspond to different users, and each of the data collection zones includes a plurality of items of target data collection sub-zones to be edited by a corresponding user.

In the example, different data collection zones of the target online document correspond to different users, and each of the data collection zones includes the plurality of items of target data collection sub-zones to be edited by the corresponding user. Each of the data collection zones corresponds to one user, and different users correspond to different data collection zones.

In this way, different users are distinguished in an online document through the data collection zones, and data collection is conducted on the plurality of users based on a document, such that data collection efficiency is improved. In addition, the target data collection sub-zone corresponding to each of the data collection zones may be configured to collect data corresponding to different data collection sub-tasks, that is, to collect data of a related target data object.

Step 902, a document link of a document is transmitted to a plurality of users according to configuration information, where the document link is associated with display permission information, and the display permission information is configured to indicate that a data collection zone visible to a first user receiving the document link is different from a data collection zone visible to a second user receiving the document link.

In the example, the document link of the target online document is transmitted to the plurality of users according to the configuration information. The configuration information may include user identifiers of the plurality of users to whom the target online document is transmitted and transmission time.

It should be noted that methods for transmitting the document link of the document to the plurality of users according to the configuration information may be different in different application scenes, which are illustrated as follows:

In some examples of the disclosure, second configuration information is preset, and the second configuration information is pre-configured with a corresponding group identifier of a user and corresponding notification time. The notification time may be not only specific time, but also a notification period. The group identifier is configured to indicate identifier information of a user group to which the user belongs after a plurality of users constitute the user group.

In the example, the second preset configuration information is queried, and one or more group identifiers to which the plurality of users belong and the corresponding notification time are obtained. Further, the document link is transmitted to one or more groups through a system virtual user according to the one or more group identifiers and the corresponding notification time.

That is, the document link is directly transmitted to the user group, such that a problem of low transmission efficiency caused when the document link is transmitted to the plurality of users corresponding to the target online document one by one is avoided. The system virtual user may be a service virtual user configured in a corresponding application.

Figure 10:
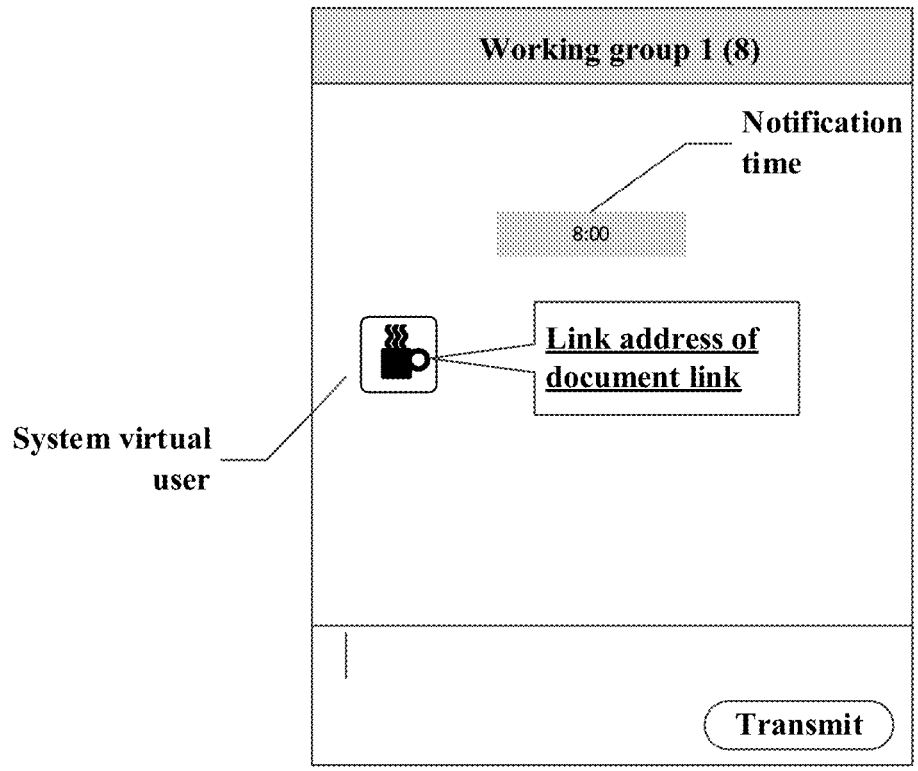
FIG. 10(A) is a schematic diagram of yet another scene for processing a document according to an example of the disclosure.
FIG. 10(B) is a schematic diagram of still another scene for processing a document according to an example of the disclosure.
Figure 10:
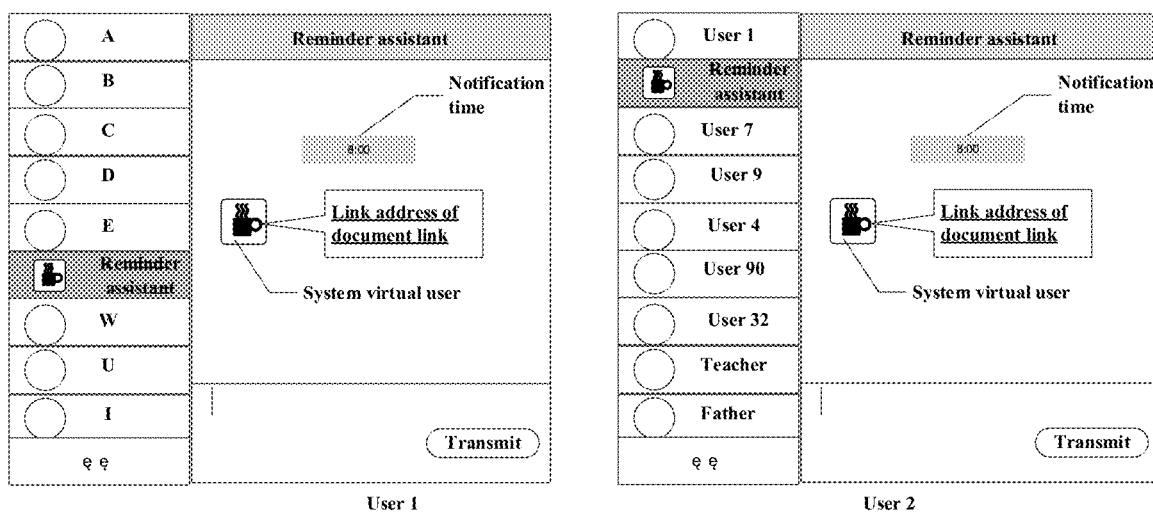

For instance, in response to determining that an identifier of a user group of the plurality of users to whom the target online document is to be transmitted is "working group 1" and corresponding notification time is 8 o'clock a.m. as shown in FIG. 10(A), the document link corresponding to the target online document is transmitted to the "working group 1" through a system virtual user "reminder assistant" at 8 o'clock a.m. In this way, transmission efficiency of the target online document is further improved, and data collection intelligence is enhanced.

In some examples of the disclosure, third configuration information is preset, and the third configuration information includes a user identifier of each user and corresponding notification time. The notification time may be not only a specific time point, but also a notification period.

In the example, the third preset configuration information is queried, and the user identifiers of the plurality of users and the corresponding notification time are obtained. Further, the document link is transmitted to each user through a system virtual user according to the user identifiers of the plurality of users and the corresponding notification time. The system virtual user may be a service virtual user configured in a corresponding application.

For instance, in response to determining that the user identifiers of the plurality of users to whom the target online document is to be transmitted include "user 1" and "user 2" and the corresponding notification time is 8 o'clock a.m. as shown in FIG. 10(B), the document link is transmitted to the "user 1" and "user 2" through the system virtual user "reminder assistant" at 8 o'clock a.m.

In addition, in the example, the document link is configured in association with display permission of the data collection zones corresponding to different users in the target online document. In this way, each user may only see the corresponding data collection zone, such that data leakage of other users is avoided.

It should be noted that methods for configuring the document link in association with the display permission of the data collection zones corresponding to different users in the target online document are different in different application scenes, which are illustrated as follows:

In some possible examples, in response to detecting a clicking operation of the user for the document link, user identifier information, for instance, user name information, of the user is obtained, a preset data form is queried based on the user identifier information, where the data form includes a corresponding relation between user representation and the corresponding data collection zone, and data collection zone information corresponding to the user is obtained based on the corresponding relation. In this way, the corresponding data collection zone information is displayed to the user.

In some other possible examples, the server pre-marks the user identifier information having editing permission corresponding to each data collection zone in the target online document corresponding to the document link, clicks on the user identifier information of the user in response to detecting a clicking operation from the user on the document link, and enables the user identifier information to match the user identifier information having the editing permission. In this way, when the target online document is displayed to the user, the data collection zone where the user identifier information successfully matches the user identifier information having the editing permission is displayed, and all the data collection zones where matching is unsuccessful are hidden.

Step 903, the target online document corresponding to the document link is opened in response to an opening operation from a user, editing information triggered by the user in the target data collection sub-zone of the visible data collection zone corresponding to the user is received, and a target data value in the target data collection sub-zone is updated according to the editing information, where in the same target data collection period or target data collection task, in response to determining that the user opens the target online document repeatedly, the target data value corresponding to the target data collection sub-zone of the data collection zone is updated according to the editing information input when the target online document is subsequently opened.

In the example, the target online document corresponding to the document link is opened in response to the opening operation from the user, and further the editing information triggered by the user in the target data collection sub-zone of the visible data collection zone corresponding to the user is received.

Further, the target data value in the target data collection sub-zone is updated according to the editing information. In the same target data collection period or target data collection task, in response to the user repeatedly opening the target online document, the target data value corresponding to the target data collection sub-zone of the data collection zone is updated according to the editing information input when the target online document is subsequently opened. That is, in the example, after the editing information of repeatedly editing the data collection zone corresponding to the user by repeatedly clicking on the document link by the user is obtained, the same data collection zone corresponding to the user in the target online document is updated synchronously with the editing information of repeated editing. That is, the same user may edit the target data collection sub-zone of the data collection zone repeatedly, it is the same data collection area that is edited repeatedly, and no new data collection zone is added to collect the editing information input from the user.

The server may store the editing information input from the user each time in the data collection zone, instead of generating a new data collection zone each time. The server transmits the document link of the target online document to the corresponding user each time, and the user inputs the current editing information based on the received target online document. Although the user clicks on the document link repeatedly, data is input based on the same target online document. The target online document is regarded as a carrier for editing information collection, and does not need to be regenerated each time, such that data collection efficiency is greatly improved.

In order to avoid data leakage of other users when the target online document is displayed, a triggering operation from the user on the document link is obtained in some examples of the disclosure, and the user identifier of the user is identified. For instance, a user identifier of clicking on the document link is obtained through a preset hook function.

Further, the data collection zone corresponding to the user identifier is displayed to the user according to the preset permission information. The preset permission information indicates the data collection zone for which the user has editing permission. For instance, the permission information may include a data collection zone identifier of the data collection zone for which the user has the editing permission.

In some examples of the disclosure, first configuration information is preset. The first configuration information includes user-associated information. The user-associated information includes information associated with a data collection task. In the example, the first preset configuration information is queried, such that the user-associated information configured for system setting in an online document to be created is obtained.

When the online document is generated, associated information of each user is configured to a corresponding field of the data collection zone corresponding to each user in the document, and the user-associated information is prohibited from being edited by the user, such that filling efficiency of the online document is improved, and reliability of data collection of the online document is ensured to a certain extent.

In conclusion, according to the method for processing a document of the example of the disclosure, the plurality of items of target data are collected in different data collection zones corresponding to different users in the target online document, such that the editing information of a plurality of target users may be collected based on a target online document. In addition, when the user triggers the document link and edits the data collection zone corresponding to the user repeatedly, the same data collection zone corresponding to the user in the target online document is synchronously updated with the editing information of the data collection zone edited repeatedly, and no new data collection zone is added, such that increase in internal storage pressure caused by each time of addition of a new data collection zone is avoided, and further data collection efficiency is improved.

The size of data of the target online document configured to collect a plurality of items of target data is generally great. In order to avoid memory overflow caused by the great size of data and automatically archive collection results, the data of the target online document may be archived periodically.

In some examples of the disclosure, a document update period is preset, and the target online document configured to collect the plurality of target data for different users in a next period is obtained in response to reaching the preset document update period. The editing information of collecting the target online document in each document update period is archived and stored once. Then, after editing information in a last target online document is stored, a target online document to which no corresponding editing information is input is re-transmitted.

In some examples, the document link corresponding to the target online document is stored in a preset cloud storage space, such that traceability of the input target data collection sub-zone is achieved. For instance, the target online document is stored in the form of a link, such that storage memory of the cloud storage space is saved.

In an actual execution process, legitimacy of the editing operation further needs to be verified when the editing information is input in an example of the disclosure, such that the legitimacy of the input editing information is ensured.

Figure 11:
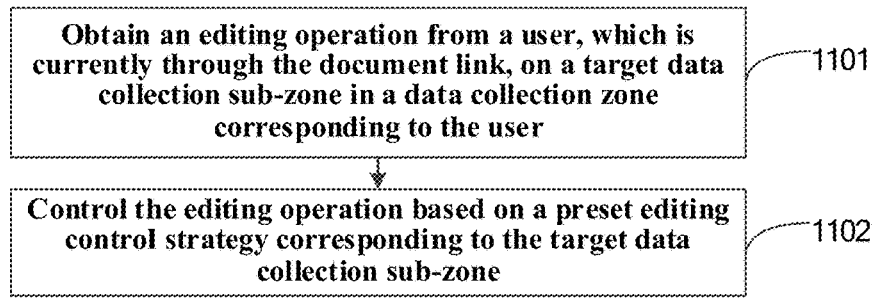
FIG. 11 is a schematic flow diagram of yet another method for processing a document according to an example of the disclosure.

In the example, as shown in FIG. 11, the method further includes the following:

Step 1101, an editing operation from a user on a target data collection sub-zone of a data collection zone corresponding to the user currently through a document link is obtained.

In the example, after it is detected that the user clicks on the corresponding document link, the data collection zone corresponding to the user in a target online document may be displayed to the user, and the user executes the editing operation in the target data collection sub-zone of the data collection zone corresponding to the user. For instance, when the target data collection sub-zone is an input zone of sales, the editing operation is an input operation of the sales.

Step 1102, the editing operation is controlled according to a preset editing control strategy corresponding to the target data collection sub-zone.

In the example, the editing operation is controlled according to the preset editing control strategy corresponding to a document position. The editing control strategy is configured to indicate a specific manner for controlling permission based on other information such as time associated with permission information.

It should be noted that methods for controlling the editing operation according to the preset editing control strategy corresponding to the target data collection sub-zone are different in different application scenes, which are illustrated as follows:

In some examples of the disclosure, a data editing zone is displayed according to a first display state within editing restriction duration, and the data editing zone is displayed according to a second display state outside the editing restriction duration. The second display state is configured to remind the user that editing is not currently allowed in the zone. Editing time corresponding to the editing operation and the preset editing restriction duration corresponding to the target data collection sub-zone are obtained. In response to detecting that the editing time and the editing restriction duration satisfy a preset relationship, a preset identifier is set for editing information generated by the editing operation.

The preset identifier may be identifier information indicating that editing is conducted in non-editing restriction duration, or identifier information indicating that editing is conducted in the editing restriction duration, or identifier information of preset duration exceeding the editing restriction duration. The identifier information described above may be text, images, codes, etc., which are not listed herein. In addition, the preset identifier may be generated in a server according to a random algorithm or other preset algorithms, or may be generated locally in a user terminal where the user is located. The identifier information may be synchronized locally to the user terminal or the server after the identifier information is generated.

In addition, in some possible instances, a distinguishing operation may be conducted based on differences of the preset identifier, such that a specific case that the editing time does not belong to the editing restriction duration is indicated. For instance, if starting time of the editing time belongs to the editing restriction duration and ending time of the editing time exceeds ending time of the editing restriction duration, a first preset identifier is generated for the corresponding editing information. For instance, if starting time of the editing time does not belong to the editing restriction duration and ending time of the editing time does not belong to the editing restriction duration, a second preset identifier is generated for the corresponding editing information. For another instance, if starting time of the editing time belongs to the editing restriction duration and ending time of the editing time also belongs to the editing restriction duration, a third preset identifier is generated for the corresponding editing information, such that subsequent classified management of the editing information is facilitated. Manners for generating the first preset identifier, the second preset identifier and the third preset identifier may be preset, such that different cases of the editing duration of the editing information are distinguished.

Therefore, in the example, a collection demand of the same user for a target data collection sub-zone in a plurality of periods of time is satisfied, a plurality of pieces of editing restriction duration may be set based on an editing position of the related target data collection sub-zone, and confusion between the target data collection sub-zones to be filled repeatedly can be avoided through restriction of the editing restriction duration. Further, confusion between data objects to be collected in different duration is avoided.

In some examples of the disclosure, if the permission information is associated with the time information, the editing time corresponding to the editing operation and the preset editing restriction duration corresponding to the document position are obtained. The editing restriction duration may be set according to scene demands.

Further, indication information prohibiting overtime editing is transmitted in response to determining that the editing time exceeds the editing restriction duration. Indication information prohibiting in-advance editing is transmitted in response to determining that the editing time is in advance of the editing restriction duration.

In some scenes, in addition to obtainment of the editing information input into the target online document, evaluation and analysis may be further conducted based on the obtained editing information, such that a demand of evaluating data in some scenes is satisfied.

In an example of the disclosure, the editing information of the user for the plurality of target data collection sub-zones corresponding to the user may be obtained, and a corresponding target data editing index is generated according to the editing information.

The target data editing index is associated with information in the extracted editing information. For instance, in response to extracting a preset identifier indicating failure to edit data in the preset target data collection sub-zone on time, the number of times of failure to fill with the editing information on time may be generated according to the preset identifier, so as to be regarded as the target data editing index.

For another instance, in response to extracting editing consumption duration of the preset target data collection sub-zone, filling efficiency may be generated to be the target data editing index according to the editing consumption duration.

In conclusion, according to the method for processing a document of the example of the disclosure, the target online document may be automatically generated and/or archived, or legitimacy of the editing operation from the user on the target online document is verified. In this way, timely archiving of related data is facilitated, the editing operation is standardized, problems such as memory overflow and data error caused by the great size of data are avoided, data collection accuracy is ensured, and technical support is provided to satisfy data collection demands of related scenes.

Finally, a method for editing the online document by a user side in a data collection scene is illustratively described, and reference may be made to introduction of other examples for related contents.

Figure 12:
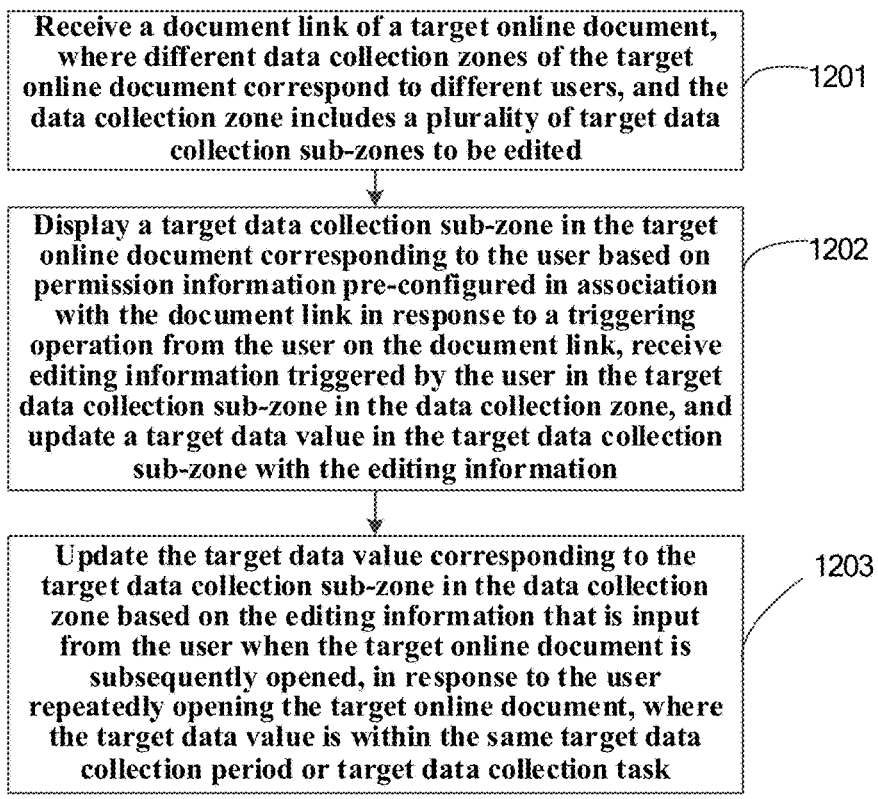
FIG. 12 is a schematic flow diagram of still another method for processing a document according to an example of the disclosure.

FIG. 12 is a flow diagram of a method for processing a document according to another example of the disclosure. As shown in FIG. 12, the method includes the following steps:

Step 1201, a document link of a target online document is received, where different data collection zones of the target online document correspond to different users, and the data collection zone includes a plurality of target data collection sub-zones to be edited.

In the example, a user side receives the document link of a document. Different data collection zones of the document correspond to different users, and the data collection zone includes the plurality of items of target data collection sub-zones to be edited.

Step 1202, a target data collection sub-zone in the target online document corresponding to a user is displayed according to permission information pre-configured in association with the document link in response to a triggering operation from the user on the document link, editing information triggered by the user in the target data collection sub-zone is received, and a target data value in the target data collection sub-zone is updated according to the editing information.

Step 1203, in response to the user repeatedly opening the target online document, the data collection zones displayed to the user are the same target data collection sub-zones, and the target data value corresponding to the target data collection sub-zone of the data collection zone is updated with the editing information that is input from the user when the target online document is subsequently opened.

Repeated opening occur in the same target data collection period or target data collection task. The user may trigger the document link and open the target online document.

In the example, the target data collection sub-zone in the document corresponding to the user is displayed according to the permission information pre-configured in association with the document link in response to the triggering operation from the user on the document link, such that security of data collection zones of other users is protected.

In the example, the target online document corresponding to the document link is opened in response to an opening operation from the user, the editing information triggered by the user in the target data collection sub-zone of the visible data collection zone corresponding to the user is received, and the target data value in the target data collection sub-zone is updated according to the editing information. In the same target data collection period or target data collection task, in response to the user repeatedly opening the target online document, the data collection zones visible to the user may be the same data collection zone, such that the target data value corresponding to the target data collection sub-zone of the data collection zone is updated with the editing information that is input when the target online document is subsequently opened. That is, in the example, in response to the editing information of repeatedly editing the data collection zone corresponding to the user by repeatedly clicking on the document link by the user, the same data collection zone corresponding to the user in the document of the server is updated synchronously according to the editing information of repeated editing. That is, the same user may edit the target data collection sub-zone of the data collection zone repeatedly, it is the same data collection area that is edited repeatedly, and no new data collection zone is added to collect the editing information input from the user.

The server may store the editing information input from the user to the data collection zone in the same data collection period or data collection task, instead of generating a new data collection zone each time when the user opens the document link. Although the user clicks on the document link repeatedly, data is input based on the same target online document. The target online document is only regarded as a carrier for editing information, and does not need to be regenerated each time when the document link is triggered, such that data collection efficiency is greatly improved. In some examples, in different data collection periods or data collection tasks, the server may transmit a document link of a target online document carrying no editing information input in the last data collection period or task to a corresponding user, and the user inputs the editing information for a new data collection period or data collection task based on the received target online document.

In some examples, identifier information such as a document name of the automatically generated target online document may carry information of the data collection period or data collection task corresponding to the target online document, for instance, a data collection date and other period information, a name of the collection task, a location where data collection occurs, etc. For instance, in a scene of collecting store information, a document identifier of the automatically generated target online document may carry the data collection date, a store name, etc. When a plurality of data collection points exist in a certain zone, and data to be collected by each of the data collection points is filled in a preset data collection zone of the automatically generated document, the document identifier of the automatically generated target online document may carry name information of the zone, for instance, the Dongcheng District or Xicheng District.

The identifier information of the automatically generated target online document carries the information corresponding to the data collection period and/or collection task, such that archiving and searching of the target online document can be facilitated, and further data can be analyzed and used later advantageously.

In an actual editing process, in some examples of the disclosure, an editing operation of the user for the target data collection sub-zone of the data collection zone corresponding to the user through the document link is further obtained, and the editing operation is controlled according to a preset editing control strategy corresponding to the target data collection sub-zone. The editing control strategy enables the user to verify legitimacy of a type of the editing operation and an editing content of the user. For instance, if the editing control strategy is to prohibit pre-filled user-associated information from being edited, the editing operation may be considered illegal and rejected when the user edits the pre-filled user-associated information in the corresponding data collection zone.

In some examples of the disclosure, the pre-filled user-associated information is displayed in the target data collection zone, and the user-associated information may include information associated with the data collection task or inherent attribute information of the user. The associated information is prohibited from being edited by the user, such that filling efficiency of the online document is improved, and reliability of data collection of the online document is ensured to a certain extent.

In an actual filling process, the editing time of the editing operation from the user side on the online document may be further controlled, such that the collected data is obtained in time and data collection efficiency is improved.

In some examples of the disclosure, in response to the editing time corresponding to the editing operation from the user on the target data collection sub-zone of the target data collection zone not belonging to the preset editing restriction duration of the target data collection sub-zone, a preset identifier is set for editing information generated by the editing operation. The preset identifier may be identifier information indicating that editing is conducted in non-editing restriction duration, and may be text, images, codes, etc., which are not listed herein. In addition, the preset identifier may be generated in the server according to a random algorithm or other preset algorithms, or may be generated locally in a terminal where the user is located. The preset identifier may be synchronized to other devices after being generated, and for instance, may be synchronized to the server or the terminal where the user is located.

In some possible instances, a preset relationship between the editing time and the editing restriction duration of the target data collection sub-zone is diverse. For instance, the editing time is within editing allowed duration, or the editing time is within editing prohibited duration, or a duration of the editing time exceeding editing allowed duration is within a preset duration. The editing restriction duration may be other types of restriction duration in addition to the editing allowed duration and the editing prohibited duration, and for instance, may be timed editing duration. When a certain target data collection sub-zone corresponds to timed editing duration, editing time of the sub-zone may be recorded, and the editing time may be further recorded.

In some possible instances, a distinguishing operation may be conducted based on differences of the preset identifier, such that a specific relation between the editing time and the editing restriction duration is indicated. If starting time of the editing time belongs to the editing restriction duration and ending time of the editing time exceeds ending time of the editing restriction duration, a first preset identifier is generated for the corresponding editing information. For instance, if starting time of the editing time does not belong to the editing restriction duration and ending time of the editing time does not belong to the editing restriction duration, a second preset identifier is generated for the corresponding editing information. For another instance, if starting time of the editing time belongs to the editing restriction duration and ending time of the editing time also belongs to the editing restriction duration, a third preset identifier is generated for the corresponding editing information, such that subsequent classified management of the editing information is facilitated. Manners for generating the first preset identifier, the second preset identifier and the third preset identifier may be preset, such that the relationship between the editing time of the editing information and the editing restriction duration is distinguished.

In some examples of the disclosure, in response to the editing time corresponding to the editing operation from the user on the target data collection sub-zone of the target data collection zone exceeding the preset editing restriction duration of the target data collection sub-zone, prompt information prohibiting overtime editing is displayed. In response to the editing time corresponding to the editing operation from the user on the target data collection sub-zone of the target data collection zone being in advance of the preset editing restriction duration of the target data collection sub-zone, prompt information prohibiting in-advance editing is displayed. In this way, the editing time is controlled in some scenes.

In conclusion, the method for processing a document of the example of the disclosure achieves online data collection and improves data collection efficiency. In addition, different data collection zones corresponding to different users are configured in the target online document, such that the editing information of a plurality of target users may be collected based on a target online document. In addition, when the user edits the data collection zone corresponding to the user by clicking on the document link repeatedly, the same data collection zone corresponding to the user in the target online document is synchronously updated according to the editing information of the data collection zone edited repeatedly, and no new data collection zone is added, such that increase in internal storage pressure caused by each time of addition of a new data collection zone is avoided, and further data collection efficiency is improved. Further, commands of specific data collection scenes can be satisfied. For instance, a demand that the user needs to edit or collect different types of target data repeatedly in a collection period may be satisfied. The example of the disclosure may further be used in weekly report filling, work reporting and other scenarios.

The example of the disclosure further provides an apparatus for processing a document. The apparatus for processing a document according to the example of the disclosure may execute the method for processing a document according to the example of the disclosure, and has corresponding functional modules and beneficial effects upon execution of the method.

The disclosure further provides an apparatus for processing a document.

Figure 13:
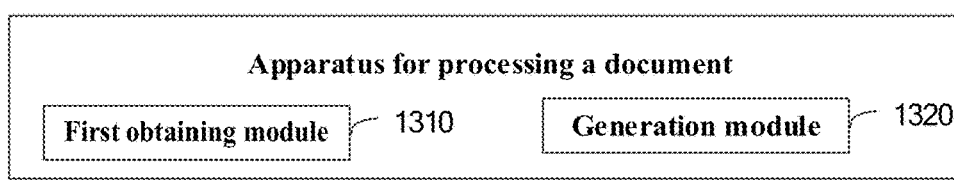
FIG. 13 is a schematic structural diagram of an apparatus for processing a document according to an example of the disclosure.

FIG. 13 is a schematic structural diagram of an apparatus for processing a document according to an example of the disclosure. The apparatus may be implemented by software and/or hardware, and may be generally integrated into an electronic device. The electronic device may be a server. As shown in FIG. 13, the apparatus includes: a first obtaining module 1310 and a generation module 1320.

The first obtaining module 1310 is configured to obtain document parameter information of a document to be created in response to satisfying a preset online document creation condition.

The generation module 1320 is configured to generate a new target online document based on the document parameter information.

The preset online document creation condition includes at least one of the following:

The preset document update period is reached, and a target data object is collected through the target online document in the update period.

Either a size of data in a first online document reaches a preset size of data, or a first online document is determined to fail to completely bear a size of data to be written in a next data collection period or data collection task, the first online document being a document configured to collect the target data object before the online document creation condition is satisfied.

Alternatively, in an example of the disclosure, the first obtaining module 1310 is further configured to: determine associated configuration information based on a data collection task of the target data object; and obtain the document parameter information of the document to be created based on the configuration information.

Alternatively, in an example of the disclosure, the first obtaining module 1310 is specifically configured to: query preset first configuration information, and obtain user-associated information in an online document to be created from the first configuration information, where the user-associated information is prohibited from being edited by a user; and/or, query preset second configuration information, and obtain document index information in an online document to be created from the second configuration information, where the document index information guides a user to edit a target data value corresponding to the index information.

Alternatively, in an example of the disclosure, the target online document is an online form, and the preset online document creation condition includes at least one of the following: a number of data collection zones of a first online form reaches a preset threshold, or a data collection zone of a first online form is determined to fail to completely bearing the size of data to be written in the next data collection period or data collection task.

Alternatively, in an example of the disclosure, the apparatus further includes: a storage module configured to archive the target online document to a preset cloud storage space.

Alternatively, in an example of the disclosure, the storage module is further configured to: preset a storage address of the target data object in the cloud storage space, and archive the target online document to the storage address of the target data object in the cloud storage space.

Alternatively, in an example of the disclosure, the storage module is further configured to: set the storage address of the target data object in the cloud storage space before collection of the target data object is completed with the target online document; and after collection of the target data object is completed with the target online document, archive the target online document to the storage address of the target data object in the cloud storage space in response to determining at least one of the following: the target online document reaches the preset document update period; or a size of data in the target online document reaches a preset size of data; or the target online document completes a size of data to be written in a data collection period or a data collection task.

Alternatively, in an example of the disclosure, the apparatus further includes a first link transmission module configured to: transmit a document link of the target online document to at least one user based on preset third configuration information.

Alternatively, in an example of the disclosure, the link transmission module is specifically configured to: obtain editing information for the target online document after the user triggers the document link in real time; and store the editing information in the target online document in response to receiving the editing information.

Alternatively, in an example of the disclosure, different data collection zones of the target online document correspond to different users, and the data collection zones comprise more than target data collection sub-zones to be edited. The apparatus further includes: a second link transmission module configured to transmit the document link of the target online document to a plurality of users based on the third configuration information, where the document link is associated with display permission information, and the display permission information indicates that a data collection zone visible to a first user receiving the document link is different from a data collection zone visible to a second user receiving the document link; and a document editing module configured to open the target online document corresponding to the document link in response to an opening operation of a user, receive editing information triggered by the user in a target data collection sub-zone of a visible data collection zone corresponding to the user, and update a target data value in the target data collection sub-zone with the editing information, where in a same target data collection period or target data collection task, in response to the user repeatedly opening the target online document, the data collection zone visible to the user comprises a same data collection zone, such that the target data value corresponding to the target data collection sub-zone in the data collection zone is updated with the editing information that is input when the target online document is subsequently opened.

Alternatively, in an example of the disclosure, the document editing module is specifically configured to: obtain an editing operation input from the user, which is through the document link, on the target data collection sub-zone of the data collection zone visible to the user; and control the editing operation based on a preset editing control strategy corresponding to the target data collection sub-zone.

Alternatively, in an example of the disclosure, document identification information of the generated target online document carries information of a data collection period or a data collection task corresponding to the target online document; or the generated target online document is filled with user-associated information, where the user-associated information includes information associated with the data collection task or inherent attribute information of a user, and the user-associated information is prohibited from being edited.

Alternatively, in an example of the disclosure, the information of a data collection period or ta data collection task corresponding to the target online document is carried as follows: period information of data collection, a name of a collection task and location information of collection are carried.

According to the apparatus for processing a document of the example of the disclosure, the document parameter information of the document to be created is obtained in response to satisfying the preset online document creation condition, and the target online document is generated according to the document parameter information. In this way, online document creation is adapted to the data collection task, and data is collected through the online document, such that data collection efficiency is improved.

The disclosure further provides an apparatus for processing a document.

Figure 14:
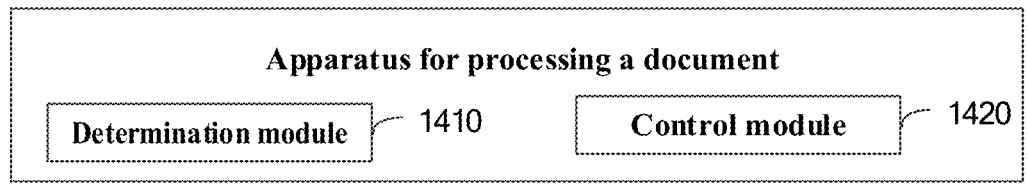
FIG. 14 is a schematic structural diagram of another apparatus for processing a document according to an example of the disclosure.

FIG. 14 is a schematic structural diagram of an apparatus for processing a document according to an example of the disclosure. The apparatus may be implemented by software and/or hardware, and may be generally integrated into an electronic device. The electronic device may be a server. As shown in FIG. 14, the apparatus includes: a determination module 1410 and a control module 1420.

The determination module 1410 is configured to receive an editing operation from a user on a document, and determine a document position corresponding to the editing operation.

The control module 1420 is configured to obtain preset permission information corresponding to the user, and control, in response to the permission information including editing operation restriction permission, the editing operation based on an editing control strategy in the editing operation restriction permission corresponding to the document position.

Alternatively, in an example of the disclosure, the editing control strategy includes presetting an editing restriction duration of a data editing zone. The control module 1420 is specifically configured to: display the data editing zone based on a first display state within the editing restriction duration, and display the data editing zone based on a second display state outside the editing restriction duration, the second display state reminding the user that editing is not currently allowed in the data editing zone; and obtain editing time corresponding to the editing operation and the editing restriction duration corresponding to the document position, and set a preset identifier for editing information generated by the editing operation in response to detecting that the editing time and the editing restriction duration satisfy a preset relationship.

Alternatively, in an example of the disclosure, the control module 1420 is specifically configured to: obtain editing time corresponding to the editing operation and preset editing restriction duration corresponding to the document position; transmit indication information about prohibiting overtime editing in response to determining that the editing time exceeds the editing restriction duration; or transmit indication information about prohibiting in-advance editing in response to determining that the editing time is in advance of the editing restriction duration.

Alternatively, in an example of the disclosure, the control module 1420 is specifically configured to: determine the document position corresponding to the editing operation, and transmit indication information about prohibiting editing in response to determining the document position to be a preset position.

Alternatively, in an example of the disclosure, different data collection zones of the document correspond to different users, and each of data collection zones includes more than target data collection sub-zones to be edited. The control module 1420 is specifically configured to: control the editing operation based on an editing control strategy in editing operation restriction permission corresponding to the document position as follows:

The editing operation of the user on the target data collection sub-zones in the data collection zone corresponding to the user is obtained.

The editing operation is controlled based on the preset editing control strategy corresponding to the target data collection sub-zones.

According to the apparatus for processing a document of the example of the disclosure, the editing operation of the user for the document is received, and the document position corresponding to the editing operation is determined; and further, the preset permission information corresponding to the user is obtained, and in response to the permission information belonging to editing operation restriction permission, the editing operation is controlled according to the preset editing control strategy corresponding to the document position. In this way, the editing operation of an online document is controlled, which provides technical support to satisfy diverse demands of different data collection scenes through the online document.

The disclosure further provides an apparatus for processing a document.

Figure 15:
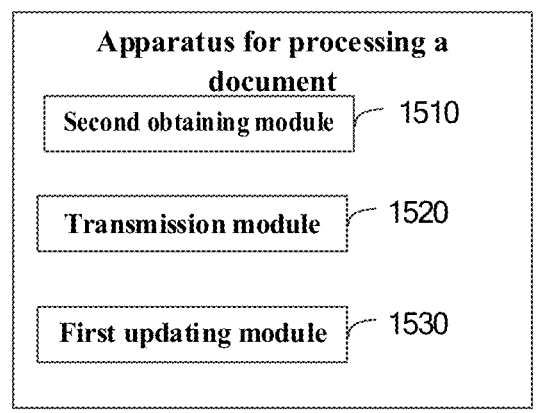
FIG. 15 is a schematic structural diagram of yet another apparatus for processing a document according to an example of the disclosure.

FIG. 15 is a schematic structural diagram of an apparatus for processing a document according to an example of the disclosure. The apparatus may be implemented by software and/or hardware, and may be generally integrated into an electronic device. The electronic device may be a server. As shown in FIG. 15, the apparatus includes: a second obtaining module 1510, a transmission module 1520 and a first updating module 1530.

The second obtaining module 1510 is configured to obtain a target online document for collecting a plurality of items of target data for different users. Different data collection zones of the target online document correspond to different users, and each of the data collection zones includes a plurality of target data collection sub-zones to be edited by a corresponding user.

The transmission module 1520 is configured to transmit a document link of the target online document to a plurality of users based on configuration information. The document link is associated with display permission information, and the display permission information indicates that a data collection zone visible to a first user receiving the document link is different from a data collection zone visible to a second user receiving the document link.

The first updating module 1530 is configured to open the target online document corresponding to the document link in response to an opening operation of a user, receive editing information triggered by the user in a target data collection sub-zone of a visible data collection zone corresponding to the user, and update a target data value in the target data collection sub-zone with the editing information. In a same target data collection period or target data collection task, in response to the user repeatedly opening the target online document, the target data value corresponding to the target data collection sub-zone in the data collection zone is updated with the editing information that is input when the target online document is subsequently opened.

Alternatively, in an example of the disclosure, the apparatus further includes a configuration module configured to: query preset first configuration information, and obtain user-associated information from the first configuration information; and configure the user-associated information to a corresponding sub-zone of the data collection zone corresponding to the user in the target online document, where the associated information is prohibited from being edited by the user.

Alternatively, in an example of the disclosure, the transmission module 1520 is specifically configured to: query preset second configuration information, and obtain one or more group identifiers to which the plurality of users belong and corresponding notification time from the second configuration information; and transmit the document link to one or more groups through a system virtual user based on the one or more group identifiers and the corresponding notification time.

Alternatively, in an example of the disclosure, the transmission module 1520 is specifically configured to: query preset third configuration information, and obtain user identifiers of the plurality of users and corresponding notification time from the third configuration information; and transmit the document link to each of the plurality of users through a system virtual user based on the user identifiers of the users and the corresponding notification time.

Alternatively, in an example of the disclosure, the apparatus further includes: an identification module configured to obtain a triggering operation of the user on the document link, and identify a user identifier of the user; and a data collection zone display module configured to display the data collection zone based on the user identifier to the user according to preset permission information.

Alternatively, in an example of the disclosure, the second obtaining module 1510 is specifically configured to: obtain the target online document for collecting the plurality of items of target data for different users in a next period in response to reaching a preset document update period.

Alternatively, in an example of the disclosure, the apparatus further includes: a document link storage module configured to store the document link corresponding to the target online document in a preset cloud storage space.

Alternatively, in an example of the disclosure, the apparatus further includes: an editing operation obtaining module configured to obtain an editing operation from the user, which is currently through the document link, on the target data collection sub-zone in the data collection zone corresponding to the user; and an editing operation control module configured to control the editing operation based on a preset editing control strategy corresponding to the target data collection sub-zone.

Alternatively, in an example of the disclosure, the editing operation control module is specifically configured to: display a data editing sub-zone based on a first display state within editing restriction duration, and display the data editing sub-zone based on a second display state outside the editing restriction duration, where the second display state is configured to remind the user that editing is not currently allowed in the sub-zone; and obtain editing time corresponding to the editing operation and the editing restriction duration corresponding to a document position, and set a preset identifier for editing information generated by the editing operation in response to detecting that the editing time and the editing restriction duration satisfy a preset relationship.

Alternatively, in an example of the disclosure, the editing operation control module is specifically configured to: obtain editing time corresponding to the editing operation and preset editing restriction duration corresponding to a document position; transmit indication information about prohibiting overtime editing in response to determining that the editing time exceeds the editing restriction duration; and transmit indication information about prohibiting in-advance editing in response to determining that the editing time is in advance of the editing restriction duration.

Alternatively, in an example of the disclosure, the apparatus further includes: an editing information obtaining module configured to obtain the editing information of the user for a plurality of target data collection sub-zones corresponding to the user; and a data editing index generation module configured to generate a target data editing index of the user based on the editing information.

According to the apparatus for processing a document of the example of the disclosure, the plurality of items of target data are collected in different data collection zones corresponding to different users in the target online document, such that the editing information of a plurality of target users may be collected based on a target online document. In addition, when the user triggers the document link and edits the data collection zone corresponding to the user repeatedly, the same data collection zone corresponding to the user in the target online document is synchronously updated according to the editing information of the data collection zone edited repeatedly, and no new data collection zone is added, such that increase in internal storage pressure caused by each time of addition of a new data collection zone is avoided, and further data collection efficiency is improved.

The disclosure further provides an apparatus for processing a document.

Figure 16:
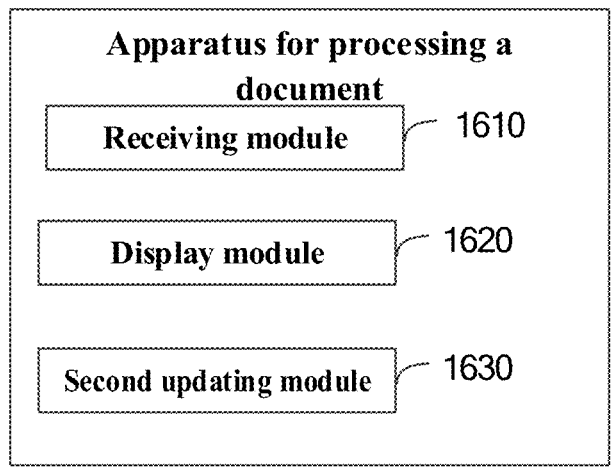
FIG. 16 is a schematic structural diagram of still another apparatus for processing a document according to an example of the disclosure.

FIG. 16 is a schematic structural diagram of an apparatus for processing a document according to an example of the disclosure. The apparatus may be implemented by software and/or hardware, and may be generally integrated into an electronic device. The electronic device may be a user terminal. As shown in FIG. 16, the apparatus includes: a receiving module 1610, a display module 1620, and a second updating module 1630.

The receiving module 1610 is configured to receive a document link of a document. Different data collection zones of the document correspond to different users, and the data collection zone includes a plurality of target data collection sub-zones to be edited.

The display module 1620 is configured to display a target data collection zone corresponding to a user in the document based on permission information pre-configured in association with the document link in response to a triggering operation of the user for the document link.

The second updating module 1630 is configured to open the target online document corresponding to the document link in response to an opening operation from a user, receive editing information triggered by the user in a target data collection sub-zone of a visible data collection zone corresponding to the user, and update a target data value in the target data collection sub-zone according to the editing information. In the same target data collection period or target data collection task, in response to the user repeatedly opening the target online document, the data collection zones visible to the user are the same data collection zone, such that the target data value corresponding to the target data collection sub-zone of the data collection zone is updated according to the editing information that is input when the target online document is subsequently opened.

Alternatively, in an example of the disclosure, the apparatus further includes: an associated information display module configured to display pre-filled user-associated information in a target data zone, where the association information is prohibited from being edited by the user.

Alternatively, in an example of the disclosure, the apparatus further includes an identifier setting module configured to: set a preset identifier for the editing information generated by an editing operation in response to determining that editing time corresponding to the editing operation of the user on the target data collection sub-zone in a target data collection zone and editing restriction duration of the target data collection sub-zone satisfy a preset relationship.

Alternatively, in an example of the disclosure, the editing time and the editing restriction duration of the target data collection sub-zone satisfy the preset relationship including at least one of the following:

The editing time is within an editing allowed duration.

The editing time is within an editing prohibited duration.

A duration of the editing time exceeding editing allowed duration is within preset duration.

Alternatively, in an example of the disclosure, the apparatus further includes: a prompt information display module configured to display prompt information about prohibiting overtime editing in response to determining that editing time corresponding to an editing operation of the user on the target data collection sub-zone of the target data collection zone exceeds an editing allowed duration of the target data collection sub-zone; and The prompt information display module is further configured to display prompt information prohibiting in-advance editing in response to determining that editing time corresponding to an editing operation of the user on the target data collection sub-zone of the target data collection zone is in advance of editing allowed duration of the target data collection sub-zone.

The apparatus for processing a document of the example of the disclosure achieves online data collection and improves data collection efficiency. In addition, different data collection zones corresponding to different users are configured in the target online document, such that the editing information of a plurality of target users may be collected based on a target online document. In addition, when the user edits the data collection zone corresponding to the user by clicking on the document link repeatedly, the same data collection zone corresponding to the user in the target online document is synchronously updated according to the editing information of the data collection zone edited repeatedly, and no new data collection zone is added, such that increase in internal storage pressure caused by each time of addition of a new data collection zone is avoided, and further data collection efficiency is improved. Further, commands of specific data collection scenes can be satisfied. For instance, a demand that the user needs to edit or collect different types of target data repeatedly in a collection period may be satisfied.

In order to implement the examples described above, the disclosure further provides a computer program product, which includes a computer program/instruction. The computer program/instruction implements the method for processing a document of the examples described above when being executed by a processor.

Figure 17:
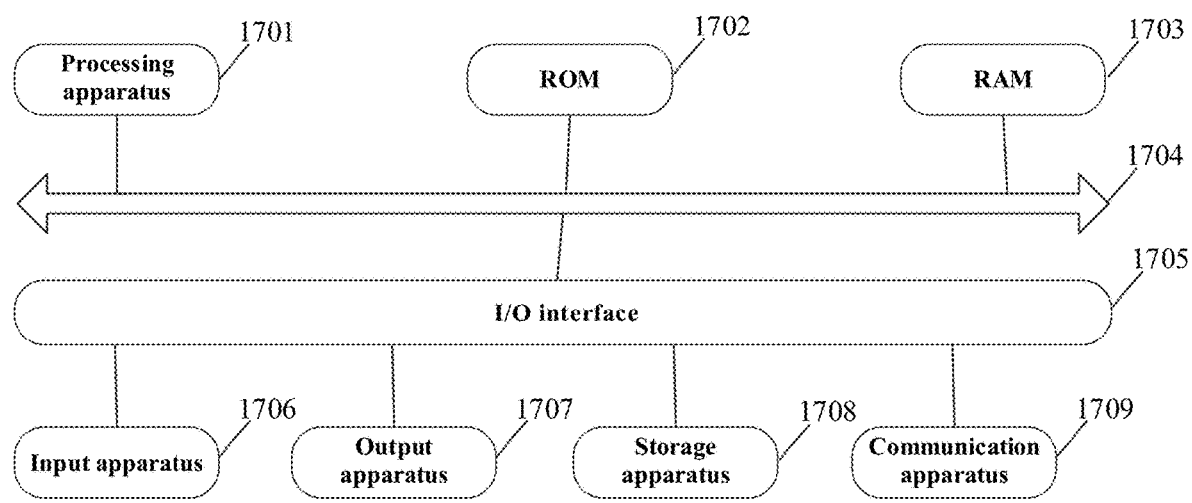
FIG. 17 is a schematic structural diagram of an electronic device according to an example of the disclosure.

FIG. 17 is a schematic structural diagram of an electronic device according to an example of the disclosure.

Specifically, FIG. 17 shows a schematic structural diagram suitable for implementing an electronic device 1700 according to an example of the disclosure below. The electronic device 1700 according to the example of the disclosure may be, but is not limited to, a mobile terminal such as a mobile phone, a notebook computer, a digital broadcast receiver, a personal digital assistant (PDA), a tablet computer (PAD), a portable multimedia player (PMP), or a vehicle-mounted terminal (for instance, a vehicle-mounted navigation terminal), and a fixed terminal such as a digital television (TV) or a desktop computer. The electronic device shown in FIG. 17 is only illustrative, and is not intended to limit functions and a use scope of the examples of the disclosure.

As shown in FIG. 17, the electronic device 1700 may include a processing apparatus (for instance, a central processing unit or a graphics processing unit) 1701, which may execute various appropriate actions and processing according to a program stored in a read only memory (ROM) 1702 or a program loaded from a storage apparatus 1708 to a random access memory (RAM) 1703. The RAM 1703 further stores various programs and data required for operations of the electronic device 1700. The processing apparatus 1701, the ROM 1702 and the RAM 1703 are connected to one another by means of a bus 1704. An input/output (I/O) interface 1705 is further connected to the bus 1704.

Generally, the following apparatuses may be connected to the I/O interface 1705: an input apparatus 1706 including, for instance, a touch screen, a touch pad, a keyboard, a mouse, a camera, a microphone, an accelerometer, a gyroscope, etc.; an output apparatus 1707 including, for instance, a liquid crystal display (LCD), a speaker, a vibrator, etc.; the storage apparatus 1708 including, for instance, a magnetic tape, a hard disk, etc.; and a communication apparatus 1709. The communication apparatus 1709 may allow the electronic device 1700 to be in wireless or wired communication with other devices so as to achieve data exchange. Although FIG. 17 shows the electronic device 1700 including various apparatuses, it should be understood that not all the apparatuses shown are required to be implemented or included. More or fewer apparatuses may be alternatively implemented or included.

Particularly, according to the example of the disclosure, the process described above with reference to the flow diagram may be implemented to be a computer software program. For instance, an example of the disclosure includes a computer program product, which includes a computer program born by a non-transitory computer-readable medium. The computer program includes a program code configured to execute the method shown in the flow diagram. In such an example, the computer program may be downloaded and configured from a network through the communication apparatus 1709, or configured from the storage apparatus 1708, or configured from the ROM 1702. The computer program executes the functions defined in the method for processing a document according to the example of the disclosure when being executed by the processing apparatus 1701.

It should be noted that the computer-readable medium described in the disclosure may be a computer-readable signal medium, or a computer-readable storage medium, or any combination thereof. For instance, the computer-readable storage medium may be, but is not limited to, an electronic, magnetic, optical, electromagnetic, infrared, or semiconductor system, apparatus, or device, or any suitable combination thereof. More specific instances of the computer-readable storage medium may include, but are not limited to, an electrical connection having on one or more wires, a portable computer disk, a hard disk, a random access memory (RAM), a read only memory (ROM), an erasable programmable read only memory (EPROM or a flash memory), an optical fiber, a portable compact disk read only memory (CD-ROM), an optical storage device, a magnetic storage device, or any suitable combination thereof. In the disclosure, the computer-readable storage medium may be any tangible medium including or storing a program. The program may be used by or in combination with an instruction execution system, apparatus or device. In the disclosure, the computer-readable signal medium may include a data signal in a baseband or as part of a carrier for transmission, and the data signal carries a computer-readable program code. The transmitted data signal may be in various forms, which may be, but is not limited to, an electromagnetic signal, an optical signal, or any suitable combination thereof. The computer-readable signal medium may further be any computer-readable medium other than the computer-readable storage medium. The computer-readable signal medium may transmit, propagate or transmit a program used by or in combination with an instruction execution system, apparatus or device. The program code included in the computer-readable medium may be transmitted by any suitable medium, which may be, but is not limited to, an electric wire, an optical cable, radio frequency (RF), etc., or any suitable combination thereof.

In some embodiments, a client and a server may be in communication with each other with any currently known or future-developed network protocol, for instance, a hypertext transfer protocol (HTTP), and may be interconnected with digital data communication (for instance, a communication network) in any form or medium. Instances of the communication network include a local area network (LAN), a wide area network (WAN), the internet work (for instance, the Internet), an end-to-end network (for instance, an ad hoc end-to-end network), and any networks known at present or developed in future.

The computer-readable medium may be included in the electronic device, or may exist independently without being assembled into the electronic device.

The computer-readable medium bears one or more programs. When the one or more programs are executed by the electronic device, the electronic device obtains the document parameter information of the document to be created in response to satisfying the preset online document creation condition, and generates the target online document according to the document parameter information. In this way, online document creation is achieved, and data is automatically collected through the online document, such that data collection efficiency is improved.

A computer program code configured to execute an operation of the disclosure may be written in one or more programming languages or a combination thereof. The programming languages include, but are not limited to, object-oriented programming languages such as Java, Smalltalk, and C++, and further include conventional procedural programming languages such as "C" or similar programming languages. The program code may be executed entirely on a user computer, executed partially on a user computer, executed as a stand-alone software package, executed partially on a user computer and partially on a remote computer, or executed entirely on the remote computer or a server. In the case involving the remote computer, the remote computer may be connected to the user computer through any type of networks including the local area network (LAN) or the wide area network (WAN), or may be connected to an external computer (for instance, the remote computer is connected through the Internet by an Internet service provider).

The flow diagrams and block diagrams in the accompanying drawings illustrate system structures, functions and operations, which may be achieved according to systems, methods and computer program products in all the examples of the disclosure. In view of this, each block in the flow diagrams or block diagrams may represent a module, a program segment, or part of a code, which includes one or more executable instructions configured to implement specified logic functions. It should further be noted that in some alternative implementations, the functions noted in the blocks may also occur in an order different from that in the accompanying drawings. For instance, the functions represented by two continuous blocks may be actually implemented basically in parallel, or may be implemented in reverse orders, which depends on the involved functions. It should further be noted that each block in the block diagrams and/or flow diagrams and combinations of the blocks in the block diagrams and/or the flow diagrams may be implemented with dedicated hardware-based systems that implement the specified functions or operations, or may be implemented with combinations of dedicated hardware and computer instructions.

The units involved in the examples described in the disclosure may be implemented by software or hardware. Names of the units do not limit the units themselves in some cases.

The functions described herein may be at least partially executed by one or more hardware logic components. For instance, illustrative types of hardware logic components that may be used include, but are not limited to, a field programmable gate array (FPGA), an application-specific integrated circuit (ASIC), an application-specific standard product (ASSP), a system on chip (SOC), a complex programmable logic device (CPLD), etc.

In the context of the disclosure, the machine-readable medium may be a tangible medium, which may include or store a program used by or used in combination with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific instances of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a portable compact disk read only memory (CD-ROM), an optical storage device, a magnetic storage device, or any suitable combination thereof.

What are described above are merely illustrative of preferred examples of the disclosure and principles of the technology employed. Those skilled in the art should understand that the disclosure scope of the disclosure is not limited to the technical solution formed by a specific combination of the technical features described above, and should further cover other technical solutions formed by any combination of the technical features described above or their equivalent features without departing from the disclosed concept, for instance, the technical solution formed by replacing the features with the technical features having similar functions disclosed in (but not limited to) the disclosure or vice versa.

Further, although operations are depicted in a particular order, it should be understood that the operations are not required to be executed in the particular order shown or in a sequential order. In some cases, multitasking and parallel processing may be advantageous. Likewise, although several specific implementation details are included in the above discussion, the details should not be construed as limiting the scope of the disclosure. Some features described in the context of separate examples may also be implemented in combination in a single example. On the contrary, various features described in the context of a single example may also be implemented in a plurality of examples independently or in any suitable sub-combination manner.

Although the subject is described in languages of specific structural features and/or methodological logic actions, it should be understood that the subject defined in the appended claims is not necessarily limited to the specific features or actions described above. On the contrary, the specific features and actions described above are merely illustrative forms of implementing the claims.

We claim:

1. A method for processing a document, comprising:
obtaining document parameter information of a document to be created in response to satisfying a preset online document creation condition; and
generating a new target online document based on the document parameter information,
wherein the preset online document creation condition comprises at least one of the following:
a preset document update period is reached, and a target data object is collected through the target online document in the update period; or
either a size of data in a first online document reaches a preset size of data, or a first online document is determined to fail to completely bear a size of data to be written in a next data collection period or data collection task, the first online document being a document configured to collect the target data object before the online document creation condition is satisfied;
wherein different data collection zones of the target online document correspond to different users, the data collection zones comprise more than two target data collection sub-zones to be edited, and the method further comprises:
transmitting a document link of the target online document to a plurality of users based on third configuration information, wherein the document link is associated with display permission information, and the display permission information indicates that a data collection zone visible to a first user receiving the document link is different from a data collection zone visible to a second user receiving the document link; and
opening the target online document corresponding to the document link in response to an opening operation of a user, receiving editing information triggered by the user in a target data collection sub-zone of a visible data collection zone corresponding to the user, and updating a target data value in the target data collection sub-zone with the editing information, wherein in a same target data collection period or target data collection task, in response to the user repeatedly opening the target online document, the data collection zone visible to the user comprises a same data collection zone, such that the target data value corresponding to the target data collection sub-zone in the data collection zone is updated with the editing information that is input when the target online document is subsequently opened.

2. The method according to claim 1, wherein obtaining document parameter information of a document to be created comprises:
determining associated configuration information based on a data collection task of the target data object; and
obtaining the document parameter information of the document to be created based on the configuration information.

3. The method according to claim 2, wherein obtaining the document parameter information of the document to be created based on the configuration information comprises at least one of:
querying preset first configuration information, and obtaining user-associated information in an online document to be created from the first configuration information, wherein the user-associated information is prohibited from being edited by a user; or
querying preset second configuration information, and obtaining document index information in an online document to be created from the second configuration information, wherein the document index information guides a user to edit a target data value corresponding to the index information.

4. The method according to claim 1, wherein the target online document is an online form, and the preset online document creation condition comprises at least one of the following:
a number of data collection zones of a first online form reaches a preset threshold, or
a data collection zone of a first online form is determined to fail to completely bearing the size of data to be written in the next data collection period or data collection task.

5. The method according to claim 1, further comprising:
archiving the target online document to a preset cloud storage space.

6. The method according to claim 5, further comprising:
presetting a storage address of the target data object in the cloud storage space; and
archiving the target online document to the storage address of the target data object in the cloud storage space.

7. The method according to claim 6, wherein presetting a storage address of the target data object in the cloud storage space comprises:
setting the storage address of the target data object in the cloud storage space before collection of the target data object is completed with the target online document; and
wherein archiving the target online document to the storage address of the target data object in the cloud storage space comprises:
after the collection of the target data object is completed with the target online document, archiving the target online document to the storage address of the target data object in the cloud storage space in response to determining at least one of the following:
the target online document reaches the preset document update period; or
a size of data in the target online document reaches a preset size of data; or
the target online document completes a size of data to be written in a data collection period or a data collection task.

8. The method according to claim 1, further comprising:
transmitting a document link of the target online document to at least one user based on preset third configuration information.

9. The method according to claim 8, further comprising:
obtaining editing information for the target online document after the user triggers the document link in real time; and
storing the editing information in the target online document in response to receiving the editing information.

10. The method according to claim 1, further comprising:
obtaining an editing operation input from the user, which is through the document link, on the target data collection sub-zone of the data collection zone visible to the user; and
controlling the editing operation based on a preset editing control strategy corresponding to the target data collection sub-zone.

11. The method according to claim 1, further comprising at least one of:

carrying information of a data collection period or a data collection task corresponding to the target online document in document identification information of the generated target online document; or, filling in the generated target online document with user-associated information, the user-associated information comprising information associated with the data collection task or inherent attribute information of a user.

12. The method according to claim 11, wherein carrying information of a data collection period or a data collection task corresponding to the target online document comprises:
carrying period information of data collection, a name of a collection task, or location information of collection.

13. A method for processing a document, comprising:
receiving an editing operation from a user on a document, and determining a document position corresponding to the editing operation; and
obtaining preset permission information corresponding to the user, and controlling, in response to the permission information comprising editing operation restriction permission, the editing operation based on an editing control strategy in the editing operation restriction permission corresponding to the document position
wherein controlling the editing operation based on the editing control strategy in the editing operation restriction permission corresponding to the document position comprises at least one of the following controlling:
wherein the editing control strategy comprises presetting an editing restriction duration of a data editing zone, and the controlling the editing operation comprises at least one of the following: displaying the data editing zone based on a first display state within the editing restriction duration, and displaying the data editing zone based on a second display state outside the editing restriction duration, the second display state reminding the user that editing is not currently allowed in the data editing zone; or obtaining editing time corresponding to the editing operation and editing restriction duration corresponding to the document position, and setting a preset identifier for editing information generated by the editing operation in response to detecting that the editing time and the editing restriction duration satisfy a preset relationship; or
wherein the controlling the editing operation comprises:
obtaining editing time corresponding to the editing operation and a preset editing restriction duration corresponding to the document position; transmitting indication information about prohibiting overtime editing in response to determining that the editing time exceeds the editing restriction duration; or transmitting indication information about prohibiting in-advance editing in response to determining that the editing time is in advance of the editing restriction duration; or
wherein different data collection zones of the document correspond to different users, and each of the data collection zones comprises more than two target data collection sub-zones to be edited; and wherein the controlling the editing operation comprises: obtaining an editing operation of the user on target data collection sub-zones in a data collection zone corresponding to the user; and controlling the editing operation based on a preset editing control strategy corresponding to the target data collection sub-zones.

14. The method according to claim 13, wherein controlling the editing operation based on an editing control strategy in editing operation restriction permission corresponding to the document position comprises:

determining the document position corresponding to the editing operation; and
transmitting indication information about prohibiting editing in response to the document position being a preset position.

15. A method for processing a document, comprising:
obtaining a target online document for collecting a plurality of items of target data for different users, wherein different data collection zones of the target online document correspond to different users, and each of the data collection zones comprises a plurality of target data collection sub-zones to be edited by a corresponding user;
transmitting a document link of the target online document to a plurality of users based on configuration information, wherein the document link is associated with display permission information, and the display permission information indicates that a data collection zone visible to a first user receiving the document link is different from a data collection zone visible to a second user receiving the document link; and
opening the target online document corresponding to the document link in response to an opening operation of a user, receiving editing information triggered by the user in a target data collection sub-zone of a visible data collection zone corresponding to the user, and updating a target data value in the target data collection sub-zone with the editing information, wherein in a same target data collection period or target data collection task, in response to the user repeatedly opening the target online document, the target data value corresponding to the target data collection sub-zone in the data collection zone is updated with the editing information that is input when the target online document is subsequently opened.

16. The method according to claim 15, further comprising:
querying preset first configuration information, and obtaining user-associated information from the first configuration information; and
configuring the user-associated information to a corresponding sub-zone of the data collection zone corresponding to the user in the target online document, wherein the associated information is prohibited from being edited by the user.

17. The method according to claim 15, wherein transmitting a document link of the target online document to a plurality of users based on configuration information comprises:
obtaining one or more group identifiers to which the plurality of users belong and corresponding notification time from a second configuration information; and
transmitting the document link to one or more groups through a system virtual user based on the one or more group identifiers and the corresponding notification time.

18. The method according to claim 15, wherein transmitting a document link of the target online document to a plurality of users based on configuration information comprises:
obtaining user identifiers of the plurality of users and corresponding notification time from a third configuration information; and
transmitting the document link to each of the plurality of users through a system virtual user based on the user identifiers of the users and the corresponding notification time.

19. The method according to claim 15, further comprising:
- obtaining a triggering operation of the user on the document link, and identifying a user identifier of the user; and
- displaying the data collection zone corresponding to the user identifier to the user based on preset permission information.

20. The method according to claim 15, wherein obtaining a target online document for collecting a plurality of items of target data for different users comprises:
- obtaining the target online document for collecting the plurality of items of target data for different users in a next period in response to at least one of the following:
  - reaching a preset document update period; or
  - a size of data in the target online document reaches a preset size of data; or
  - the target online document completes a size of data to be written in a data collection period or a data collection task.

21. The method according to claim 15, further comprising:
- storing the document link corresponding to the target online document in a preset cloud storage space.

22. The method according to claim 15, further comprising:
- obtaining an editing operation from the user, which is currently through the document link, on the target data collection sub-zone in the data collection zone corresponding to the user; and
- controlling the editing operation based on a preset editing control strategy corresponding to the target data collection sub-zone.

23. The method according to claim 15, further comprising:
- obtaining the editing information for a plurality of target data collection sub-zones corresponding to the user; and
- generating a target data editing index of the user based on the editing information.

24. A method for processing a document, comprising:
- receiving a document link of a target online document, wherein different data collection zones of the target online document correspond to different users, and the data collection zone comprises a plurality of target data collection sub-zones to be edited;
- displaying a target data collection sub-zone in the target online document corresponding to the user based on permission information pre-configured in association with the document link in response to a triggering operation from the user on the document link, receiving editing information triggered by the user in the target data collection sub-zone in the data collection zone, and updating a target data value in the target data collection sub-zone with the editing information; and
- updating the target data value corresponding to the target data collection sub-zone in the data collection zone based on the editing information that is input from the user when the target online document is subsequently opened, in response to the user triggering the document link and opening the target online document repeatedly, wherein the target data value is within a same target data collection period or target data collection task.

25. An electronic device, comprising:
- a processor, and
- a memory configured to store an executable instruction executable by the processor, wherein the processor is configured to read the executable instruction from the memory and execute the instruction, so as to implement the method for processing a document according to claim 1.

26. A non-transitory computer-readable storage medium, storing a computer program, wherein the computer program is configured to execute the method for processing a document according to claim 1.

* * * * *